(12) United States Patent
Tao et al.

(10) Patent No.: US 11,220,175 B2
(45) Date of Patent: Jan. 11, 2022

(54) LOW-UNSPRUNG-MASS NEAR-WHEEL IPASS SYSTEM

(71) Applicants: Jianlin Tao, Richmond Hill (CA); Evan Pi Tao, Richmond Hill (CA)

(72) Inventors: Jianlin Tao, Richmond Hill (CA); Evan Pi Tao, Richmond Hill (CA)

(73) Assignee: ROTAO TECH LTD, Richmond Hill (CA)

( * ) Notice: Subject to any disclaimer, the term of this patent is extended or adjusted under 35 U.S.C. 154(b) by 0 days.

(21) Appl. No.: 16/846,319

(22) Filed: Apr. 11, 2020

(65) Prior Publication Data

US 2021/0316604 A1   Oct. 14, 2021

(51) Int. Cl.
*B60K 7/00*   (2006.01)

(52) U.S. Cl.
CPC .... *B60K 7/0007* (2013.01); *B60K 2007/0084* (2013.01)

(58) Field of Classification Search
CPC .................................................... B60K 7/0007
See application file for complete search history.

(56) References Cited

U.S. PATENT DOCUMENTS

| | | | | |
|---|---|---|---|---|
| 8,783,394 B1 * | 7/2014 | Nam | .................... | B60K 17/043 180/61 |
| 2010/0155168 A1 * | 6/2010 | Mies | ...................... | B60G 7/001 180/300 |
| 2016/0068056 A1 * | 3/2016 | Burtov | ................. | B60K 7/0007 180/65.51 |
| 2018/0272855 A1 * | 9/2018 | Tamura | ................... | B60B 27/00 |
| 2019/0040921 A1 * | 2/2019 | Zhao | ...................... | F16D 65/18 |

(Continued)

*Primary Examiner* — Erez Gurari

(57) ABSTRACT

The present disclosure provides a machine and mechanism of an electrically controlled low-unsprung-mass wheel unit for vehicles. The design incorporates independent propulsion/braking, axle control, steering, and suspension (IPASS) of each wheel during vehicle movement. The purpose of the design is for a traction-adaptively-optimization (TAO) control which include but not limited as the following: 1) better road surface gripping and ride quality by lower unsprung mass; 2) safer, quicker, and sharper turning ability—transformative turning; 3) adaptive obstacle avoidance; 4) a list of new, unique, and advanced vehicle motion features. The mechanism comprises at least: an axle adjustment that controls the distance of a wheel from the vehicle body, which allows for the outward extension of the wheel via a slider. The slider is connected to a linear actuator, which is powered by the first independent electric motor for track width adjustment. A steering system includes a pinion, powered by the second independent motor, rolls against an inner gear at the top of the unit turn in opposing directions. Hiding the motor and gears in the hollow shaft results in an extremely low profile. A propulsion system, powered by the third independent electric motor, controls the wheel's forward and backward motions using a spline, bevel gear reducer, and planetary gear reducer. Each wheel unit also has an independent suspension system located inside the wheel rim. The suspension uses a hydraulic dampening and supporting system and springs to absorb the shock from vertical movement when driving on uneven surfaces.

20 Claims, 11 Drawing Sheets

(56) References Cited

U.S. PATENT DOCUMENTS

| | | | |
|---|---|---|---|
| 2019/0145471 A1* | 5/2019 | Carbone | F16D 49/10 |
| | | | 180/210 |
| 2019/0193504 A1* | 6/2019 | Yamada | B60K 7/0007 |
| 2019/0248233 A1* | 8/2019 | Calleija | B60B 19/00 |
| 2019/0263251 A1* | 8/2019 | Railings | A61G 5/10 |
| 2020/0138544 A1* | 5/2020 | Bono | B60B 19/003 |
| 2020/0148295 A1* | 5/2020 | Krinkin | B60D 1/01 |
| 2020/0156459 A1* | 5/2020 | Henningsgard | B66C 23/46 |
| 2020/0216128 A1* | 7/2020 | Doerksen | B62D 61/00 |
| 2020/0216129 A1* | 7/2020 | Sutherland | A61L 2/26 |
| 2020/0406675 A1* | 12/2020 | Yang | B60B 19/003 |
| 2021/0114430 A1* | 4/2021 | Mei | B60G 21/007 |

* cited by examiner

LOW-UNSPRUNG-MASS NEAR-WHEEL IPASS SYSTEM

FIELD

The present disclosure is in the field of industrial manufacturing, mechanical engineering, automobile systems, electric motors, electric vehicles, near-wheel motors, independent propulsion, steering, braking, axle extension and retraction, suspension, unsprung mass, and IPASS system, especially a low-unsprung-mass electric wheel unit with an independent propulsion/braking, axle, suspension, and steering control.

BACKGROUND

In recent years, technologies have evolved to make the previously impossible, possible. The automotive industry is considering the use of an in-wheel and/or near-wheel mechanism or system with independent propulsion to build vehicles that are simpler, more efficient, and more controllable.

The in-wheel and near-wheel system with an independent propulsion motor is a motor system incorporated into or close to the hub of a wheel to drive the wheel directly. This motor is also known as a wheel motor, wheel hub motor, wheel hub drive, or simply hub motor. All ongoing descriptions in the present disclosure will apply equally to both the in-wheel and near-wheel system. The term near-wheel system will be used interchangeably with in-wheel system. For the purpose of maintaining simplicity and generality, the term near-wheel alone will be mentioned in the context of the present disclosure, while in-wheel will be implicitly included hereafter.

Attaching motors directly to the wheels would seem an obvious choice if only for its mechanical simplicity. Although the use of multiple motors is more expensive than one central motor, the near-wheel system is more efficient because it has a lower mass and does not suffer from frictional losses in a traditional complex transmission. For each powered wheel without any transmission and mechanical linkages, the motor can develop torque that is comparable to, if not better than, that of a conventional vehicle. In many cases, the vehicle manufacturer can deliver a vehicle that goes faster or farther (or both) while costing no more than competing models. Furthermore, the ability to power each wheel of the car independently improves the car's handling substantially.

In addition to the propulsion, the steering, braking, suspension, and axle length can also be made completely independent for each wheel. That is, a wheel unit can have independent control mechanisms for driving, axle adjustment, steering, braking, and suspension. This type of design will be hereafter called I.P.A.S.S. or IPASS (Independent Propulsion/braking, Axle adjustment, Steering, and Suspension) system. For the purpose of convenience in the present disclosure, this name will also apply to IPASS systems that might not have an independent axle, braking, and/or suspension.

Traction adaptively optimized control (TAO) is a mechanism that the central controller of a vehicle sending commands to the wheels individually according to the potential road and traffic condition of each wheel. The commands include operating the propulsion, braking, axle adjustment, steering, and suspension to achieve reactions dynamically, coordinately and collaboratively. The combination of the operations achieves an optimized performance and feature.

The widespread adoption of electric motors in the automotive industry makes it more feasible for an IPASS system design. A near-wheel motor is mainly an electric motor in the present disclosure, though it can also be any other type of engine. In recent years, the public has become aware of the adverse environmental effects of vehicles powered by fossil fuels. The exhaust gases from these vehicles emit pollutants into the atmosphere, such as carbon dioxide, sulphur dioxide, particulate matter, volatile organic compounds, etc. As a result, there has been increased global warming, reduced agricultural production, and other environmental issues. Furthermore, fossil fuels are a non-renewable energy source. In an effort to be more environmentally friendly, vehicle manufacturers gradually transitioned to vehicles with electric engines. Though previous designs included hybrid vehicles that use both electric and combustible engines that work together as a temporary solution, the ultimate goal is to completely transition to electric vehicles (EV) that only use electric motors (EM).

Keeping the unsprung mass or volume to a minimum is a requirement for a good design, but the existing IPASS systems fall short in this aspect. The unsprung mass, volume, or size refers to the mass, volume, or size of everything between a vehicle's suspension system and the road. In a conventional vehicle, this typically includes the brakes, bearings, wheels, constant-velocity (CV) joints, and tires. Meanwhile, the sprung mass consists of everything supported by the suspension, which consists of the vehicle body, frame, internal components such as the motor and transmission, as well as the cargo and passengers. The problem with the current design of the IPASS system in vehicles is that the near-wheel electric motors and transmission will add greater unsprung mass. The added unsprung mass makes the vehicle feel as though its suspension and steering have not yet undergone the usual tuning activities that are a standard part of vehicle development. In general, higher unsprung mass makes a bumpier and noisier ride and can lead to wheel control issues, especially during hard acceleration or braking. This makes driving less safe. It also reduces the service life of the suspension springs and makes them more likely to break due to the work required to maintain the vehicle's traction. Thus, many automobile designers consider near-wheel motors to be an inherently problematic approach. The existing IPASS designs cannot avoid this problem so far. There is a need for a better solution to this problem.

A durability problem of the IPASS system can be avoided entirely with a modern engineering design. In existing IPASS systems, placing the motors in the wheels (as opposed to under the hood) means that they will get battered when the vehicle travels over rough roads. The motors will also be pelted by water, sand, gravel, and all the other detritus we drive over regularly. Although these conditions could pose a problem, extensive real-world testing has demonstrated that it is entirely possible to engineer a product that can endure these obstacles. Because this can be achieved, IPASS systems do not suffer from reliability issues anymore.

There is good demand in various applications for which only IPASS designs can provide distinct competitive advantages, such as low-floor cargo vehicles, antilock braking systems (ABS), anti-slip regulation (ASR), electronic stability programs (ESP), electric all-wheel-drive (AWD), all-wheel independent steering, torque vectoring, and traction-adaptively-optimized (TAO) control. All the difficulties and problems in designing a good IPASS system have previously blinded most vehicle manufacturers to its benefits. Now it is time to bring low-unsprung-mass, traction-adaptively-optimized control, and highly modularized near-wheel motors with independent propulsion, braking, steering, and especially axle adjustment.

In a motor vehicle, a powertrain comprises the main components that generate power and deliver that power to the road surface. These components include the engine, transmission, driveshafts, differentials, axles, and the final drive wheels. Hybrid powertrains also include one or more electric traction motors that operate in order to drive the vehicle wheels. All-electric vehicles (EV) eliminate the engine altogether, relying solely on electric motors for propulsion. A motor vehicle's driveline or drivetrain consists of all the parts of the powertrain, excluding the engine or motor. It is the portion of a vehicle, after the prime mover, which changes depending on whether a vehicle has front-wheel drive, rear-wheel drive, four-wheel drive, or less commonly, six-wheel or eight-wheel drive. In the broader sense, the powertrain includes all of the components used to transform stored (chemical, solar, nuclear, kinetic, potential, etc.) energy into kinetic energy for propulsion purposes. This also applies to the utilization of multiple power sources and non-wheel-based vehicles.

The transmission varies the torque output from the engine to the wheels in order to provide the driver with traction and control. The transmission uses a set of gears to vary the torque and angular velocity transmitted from the engine to the wheels; these gears allow the engine to provide optimal horsepower while maintaining the proper revolutions per minute (RPM) and preventing damage to the engine. Currently, there are five types of transmissions: (1) manual transmission, (2) front-wheel drive, (3) rear-wheel drive, (4) four-wheel drive (4WD), or (5) all-wheel drive (AWD). The vehicle's drive shaft connects the other components of the powertrain via various joints while also delivering power from the engine or transmission to the other end of the vehicle. The differentials are where the engine's power travels before reaching the wheels. In the case of a near-wheel EM, because each wheel has an independent electric motor inside that directly drives it, a separate complex transmission is not needed anymore. Also, the powertrain's structure is simplified, the weight is reduced, and the power delivery efficiency is maximized.

Another essential component of a powertrain system is the axle. An axle is a central shaft that passes through the center of the vehicle, which allows the wheels to rotate. The axle has multiple purposes: (1) maintain the position and track width relative to the vehicle body, (2) transmit driving torque to the wheels, and (3) bear the weight of the vehicle along with additional cargo. Vehicles have two types of axles: the drive axle and the dead axle. The drive axle connects the drive wheels according to its given transmission (e.g. rear-wheel or front-wheel drives). As the driveshaft turns, the drive axle transfers the motion to the wheels through a CV joint. On the other hand, the dead axle is a free-rotating axle that distributes the weight of the vehicle and cargo. This axle is more critical for larger vehicles such as trucks, which will have multiple axles to bear more substantial burdens.

There are currently two primary forms of powertrain systems: centralized powertrains and decentralized powertrains. A centralized powertrain consists of a single motor that transfers power to the corresponding wheels through a transmission. The powertrain also includes differentials, which distribute the engine torque to the drive wheels and adjust each wheel rotation speed accordingly. For example, when making a turn, the outer drive rotates faster than the inner drive wheel in order to maintain traction. This type of powertrain system is common in combustible engine vehicles, particularly vehicles that operate on one set of drive wheels (i.e. front-wheel or rear-wheel drives). The differential sits in the middle of the axle, which distributes the power to individual wheels. One inconvenience of this powertrain is that the vehicle will require a higher ground clearance to be level. Lower ground clearance is only achievable on either the front or rear side of the vehicle.

An existing decentralized powertrain has two or more motors attached to the wheels, normally one motor per driving wheel. This type of powertrain system has a simplified transmission mechanism and can obtain a higher transmission efficiency. However, the weight of the entire powertrain is unsprung or not supported by the vehicle's suspension. As a result, the vehicle is more difficult to handle, and the ride quality will be lower. Additionally, the motor is installed under the spring and thus is directly exposed to wheel vibrations. This exposure will reduce the efficiency and service life of the propulsion motor.

Once power from the engine reaches the wheels, the powertrain also affects other vehicle systems. Without the axle, a vehicle cannot turn via its steering system. The steering system is a collection of components that allows the driver to guide any given vehicle using a hand-operated steering wheel attached to a steering column. Most vehicles use a rack and pinion steering system. In this system, the steering column rotates a circular gear, known as a pinion, to engage with a rack through a linear motion to turn the wheels in the intended direction.

Initially, steering requires a lot of physical effort. A hydraulic power steering system was developed in the early 20th century to make it easier to turn. Power steering further developed as time passed; however, the vehicle also faced lower fuel efficiency due to the presence of a cylinder that applied force to the steering gear. This inefficiency inspired the development of electric power steering, which eliminated the need for this cylinder and raised fuel efficiency. Today, electric power steering is present in most modern vehicles. Electric power steering uses sensors that detect the position and torque of the steering column guided by the steering wheel. A computer module inside the electric motor then applies the assistive torque necessary for turning. In the case of an engine or motor stall, the vehicle will still have steering assist as long as the system is active.

The powertrain also affects the suspension system as the vehicle moves forward. This system consists of springs, shock absorbers, dampers, struts, and anti-sway bars working together to do the following: (1) increase wheel traction, (2) absorb shock from uneven terrain, and (3) provide stability and smoother ride quality. The suspension can be a dependent or independent system. A dependent suspension system is conventional in commercial and cargo vehicles that use the drive and dead axles (i.e. front and rear-wheel drive vehicles). However, handling is less predictable since the wheels will not be moving relative to the ground surface. Another disadvantage is that there is more unsprung mass, which will amplify vibrations on the road and lead to wheel control issues during acceleration or braking. Independent suspension is more advantageous because each wheel absorbs shock as it is moving forward. This suspension typically uses a control arm or a wishbone that connects to the chassis or vehicle frame. Any differentials, such as those associated with rear-wheel drives, are mounted on the suspension frame in the middle of the control arms or wishbones.

A vehicle's center of gravity affects the stability of the vehicle during a maneuver, such as a turn. The lower the center of gravity (the closer it is to the ground), the higher the stability of the vehicle. The vehicle has a higher resistance to rolling over if the center of gravity is kept low. The vehicle's resistance to rolling over is also influenced by the track width, the height of the suspension, and wheelbase. The wider track, longer wheelbase, and lower suspension are also key roles in stabilizing the vehicle.

Sports cars have a lower vehicle height so that they can safely maneuver sharp corners at high speeds. Bigger vehicles, on the other hand, have a higher center of gravity. This makes sharp turns dangerous since the vehicle may potentially roll over. A bigger vehicle has to slow down and make a wider turn to maintain stability. An IPASS system might help to lower the center of gravity, as well as to achieve a lower floor level for the vehicle needed for stepless kneeling. A stepless kneeling feature is used for bus loading and unloading passengers, especially passengers with impaired mobility.

The present disclosure provides a mechanism and machine that improves the powertrain system of an electric vehicle by using highly modularized low-unsprung-mass IPASS wheel units. It grants independent, synchronized, and real-time control of the propulsion/braking, axle width, steering, and suspension for each vehicle wheel during movement without adding significant unsprung mass. The mechanism is designed to make the effects of unsprung mass, size, and volume negligible and achieve the traction adaptively optimization (TAO) control, thanks to a novel independent propulsion, spline shafting, and steering mechanism. A virtual axle with a dynamic track related to the novel independent axle extension and retraction also combines the use of other IPASS system features to improve how the vehicle makes turns, particularly during sharp turns. The vehicle can therefore, be more efficient, powerful, controllable. It also enables the vehicle to perform new, unique, advanced manipulations, features, and functions as one can expect from an IPASS system. In addition to typical passenger vehicles and trucks, the new mechanism and machine of the present disclosure can be implemented on various other types of vehicles, including but not limited to: van or lorries with more than four wheels, buses, motor coaches, trolleys, trains, etc.

SUMMARY

The present disclosure provides a mechanism and machine of a general, highly modularized, and low-unsprung-mass electrical wheel unit for vehicles with independent propulsion, axle adjustment, steering, and suspension (IPASS). The purpose of the design is to achieve the traction-adaptively-optimization (TAO) control which includes but not limited as the following: 1) better road surface gripping and ride quality by lower unsprung mass; 2) safer, quicker, and sharper turning ability—transformative turning; 3) adaptive obstacle avoidance; 4) a list of new, unique, and advanced vehicle motion features, such as in-place rotation, parallel driving or parking, dynamic axle, torque vectoring, stepless kneeling, adaptive obstacle avoidance, real all-wheel drive (AWD), and pizza braking.

The mechanism comprises at least the following components. An axle adjustment dynamically controls the track width. It allows for outward extension or inward retraction of the wheel axle via a slider. The slider is connected to an electric linear actuator, which is powered by a first independent electric motor. Since there is no physical axle connecting each pair of wheels, the independent axles at the front or rear wheels work together to form a virtual axle and track width of the vehicle. The independent propulsion system, powered by a second independent electric motor near and perpendicular to the wheel shaft, controls the wheel's forward and backward motion through a spline shaft, bevel gear reducer, and planetary gear reducer. The wheel unit's low-profile steering system includes a pinion and an internal gear at the top of the wheel unit, which turn in opposing directions inside a hollow shaft. The pinion is powered by a third independent electric motor. The design of the steering system results in an extremely low profile by hiding the steering motor inside the shaft, so it requires no additional height above the wheel. Each wheel unit also has an independent suspension system located inside the corresponding wheel hub. The suspension uses a dampening mechanism, which uses hydraulic cylinders and springs to absorb the shock from vertical movement when driving on uneven surfaces.

First, the low-unsprung-mass of the wheel unit is attained by supporting the weight of all the electric motors with the suspension. This makes the motors a part of the sprung mass. It reduces the impact the independent motors have on the vehicle's unsprung mass, which is an issue for existing near-wheel motor solutions and IPASS vehicles. The unsprung mass of the wheel unit in the present disclosure can be comparable to that of a traditional vehicle.

Second, all the independently controllable components work together to make a unique transformative turning capability possible. With transformative turning, vehicle turning is safer because the independent axle extends and widens the track width. By increasing the track width of the vehicle, turning stability is increased and prevents it from rolling over. The vehicle body can also tilt to offset its center of gravity to the inner wheel side by independently adjusting the height of the suspensions. The center of gravity bias increases the vehicle's stability as well. Vehicle turning can be quicker as the independent steering allows for round steer mode (a.k.a. 4-wheel steer), where one set of wheels turns in one direction and the other set turns in the opposite direction. Since the wheel steering is completely independent, steering angles can be adjusted separately to allow the vehicle to make a quicker turn using the shortest travel path. Quicker turns are also achieved through the independent propulsion, which provides different amounts of propulsion torque to both the inner and outer wheels. As a result, the wheels can rotate at different speeds; the outer wheels typically require larger torque than the inner ones. Vehicles with this wheel unit are also capable of sharp turns, thanks to the attributes mentioned before—mainly independent propulsion, axle extending, steering, and body tilting. With the wider track width, and optimized wheel turning torque, speed, and angle, a very sharp turn that was impossible before can be achieved now.

Third, all the above independent components enable various features and functions for the vehicle. In-place rotation and parallel driving or parking can be achieved with the independent steering system; the independent axle produces a dynamic axle; the independent propulsion and steering systems work together to attain real torque vectoring, real all-wheel-drive (AWD), and antilock braking (ABS); adaptive obstacle avoidance is accomplished with the combination of the independent axle and steering system; the independent steering and regenerative braking work together to attain an emergency braking system name pizza braking; all independent components of the wheel unit are applied to achieve stepless kneeling.

DETAILED DESCRIPTION

Figure 1:
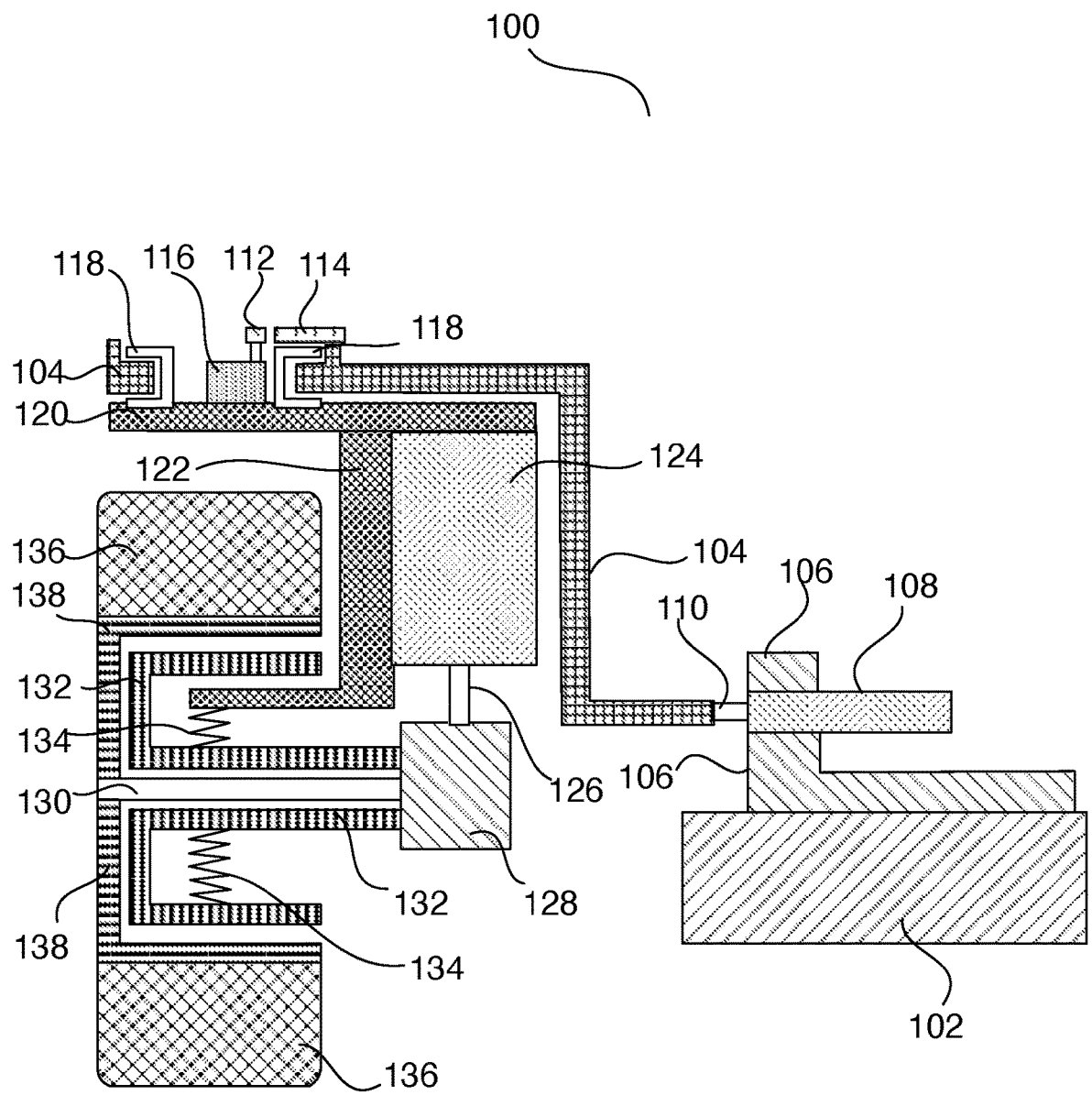
FIG. 1 illustrates a general overview of a preferred embodiment of the electric wheel unit for the left front wheel pertaining to the present disclosure.

The terminology used herein is for the purpose of describing particular embodiments only and is not intended to be limiting of the disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise. "they", "he/she", or "he or she" or are used interchangeably because "they", "them", or "their" can now be used as singular gender-neutral pronoun in modern English. It will be further understood that the terms "comprises" and/or "comprising" when used in this specification, specify the presence of stated features, steps, operations, elements, and/or components, but do not preclude the presence or addition of one or more other features, steps, operations, elements, components, and/or groups thereof. Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In the description, it will be understood that a number of techniques and steps are disclosed. Each of these has an individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

In the following description, for purposes of explanation, numerous specific details are set forth to provide a thorough understanding of the present disclosure. It will be evident, however, to one ordinarily skilled in the art that the present disclosure may be practiced without these specific details. The present disclosure is to be considered as an exemplification of the disclosure and is not intended to limit the disclosure to the specific embodiments illustrated by the figures or description below. The present disclosure will now be described by referencing the appended figures representing preferred or alternative embodiments.

The present disclosure describes a mechanism and machine of a highly modularized, low-unsprung-mass, and electrically controlled general wheel unit for building future vehicles. Each wheel unit has individually controlled propulsion/braking, axle adjustment, steering, and suspension. There are multiple objectives in the scope of the wheel module, which include: attaining a low-unsprung-mass similar to that of a traditional vehicle; improving the safety, speed, and maneuverability of a vehicle when it turns; and achieving new vehicle features with the independent components of the wheel unit as one expects from an IPASS system.

The independent axle adjustment dynamically controls the axle length, which is the distance from a wheel to the vehicle body. A pair of wheels with two independent axle length work together to form a virtual axle and track width of the vehicle. The mechanism allows for the virtual track width to be extended and retracted via a slider. In one embodiment of the present disclosure, this slider is an electric linear actuator, which is powered by a first independent electric near-wheel motor dedicated to the axle adjustment. With the independent axle mechanism, the front and rear sets of wheels are deemed to have virtual axles that connect the respective left and right wheels. The virtual axle replaces the traditional physical mechanic axle. The wheel unit's propulsion system, powered by a second independent electric near-wheel motor, controls the wheel's forward and backward movement using a spline shaft, bevel gear reducer and planetary gear reducer. The wheel unit's low-profile independent steering system steers the wheels as it turns. Most parts of the steering system are installed inside a hollow shaft, which is located on top of the wheel unit. A pinion spins against the internal gear on the top of the hollow shaft and is driven by a third independent electric near-wheel motor. The relative position between the pinion and internal gear determines the wheel's turning angle. This steering system design is extremely low-profile compared to existing IPASS systems because the steering motor and gears are mostly overlapped by the hollow shaft vertically. Placing the steering motor and gears inside the hollow shaft eliminates the need for additional space above the wheel. In other existing IPASS systems, the steering motor has to be placed above the gears, which takes up considerable space. Each wheel unit also has an independent suspension system located inside the corresponding wheel hub. In one exemplary embodiment of the present disclosure, the suspension system uses both hydraulic cylinders and springs to dampen and absorb the shock from vertical movement when driving on uneven surfaces.

The IPASS components in each wheel of the present disclosure can achieve at least three goals related to the purposes of the machine or mechanism in the present disclosure. The first goal of the IPASS wheel unit is to obtain a low-unsprung-mass comparable to that of a traditional vehicle. This low-unsprung-mass is attained by supporting all the electric motors with the suspension. Therefore, most of the added near-wheel components, such as the near-wheel motors, gears, shafts, or rods, become a part of the sprung mass instead of the unsprung mass. The shifting from the unsprung mass to sprung mass is achieved by novelly combining a spline shafting mechanism together with a hybrid hydraulic and spring suspension. As a result, a significant amount of the added vehicle's unsprung mass, which is usually an issue for existing near-wheel motor solutions and vehicles, is reduced.

The next goal of the wheel unit is for the IPASS design to improve the vehicle's turning capability. An improved turning capability implemented in one preferred embodiment of the present disclosure is called transformative turning. The vehicle's performance can be significantly enhanced by using all of the IPASS components and transforming the vehicle's physical structure and dimensions during a turning operation. The IPASS wheel unit improves three aspects of turning capability: safety, speed, and comfortability.

INCREASED SAFETY: The independent axle extension can dynamically increase the vehicle's track width while turning. The increased track width stabilizes the vehicle, which allows the vehicle to stay upright and prevents the vehicle from tipping or rolling over even when it is making sharp and difficult turns. The independent adjustment to the height of each wheel's suspension also allows the vehicle to tilt to one side and increase the length of the gravitational moment. The tilting can also lower the vehicle's center of gravity, therefore increase driving safety.

QUICKER TURNING SPEED: With independent steering, the vehicle can enter round steer mode (a.k.a. 4-wheel steer) while turning, where the front wheels turn in one direction and the rear wheels turn in the opposite direction. The independent propulsion provides different propulsion torque to each wheel, especially that adjusted to the inner and outer wheels. If the wheels rotate at different and higher speeds, the vehicle can finish the turn at a higher speed than traditional vehicles. If the independent steering adjusts the angle of each wheel to complete the turn along the shortest travel path, this can also speed up the process.

SHARP TURNS: The independent propulsion, axle extension, steering, and tilting through the suspension can now allow the vehicle to make sharper turns that were not achievable before without sacrificing safety. The new capability comes from the wheels' ability to follow the most optimized travel path during the turn.

The final goal of the wheel unit is to take advantage of all the IPASS components to implement various advanced motion features and functions. These include, but are not limited to: in-place rotation, parallel driving or parking, dynamic axle, torque vectoring, stepless kneeling, adaptive obstacle avoidance, real all-wheel-drive, and pizza braking. Further details of the above are included below in the explanations of the figures.

FIG. 1 illustrates a general overview of a preferred embodiment of the electric wheel unit (100) discussed in the present disclosure. The overview is represented as a block diagram to emphasize the major components of the technology. The diagram drawing illustrates a rear view of a projected left front wheel, provided that this wheel unit (100) is mounted on a four-wheel vehicle. The specific design described here 390 is only for convenience to illustrate the basic idea of the present disclosure, and is not to be regarded as a limitation of the design options. This includes variants in mechanical design to achieve similar features or functional purposes and variants with different materials, number of components, shapes, structures, and orders, which are obvious in the eyes of those who are ordinarily skilled in the art.

The overall block diagram illustrates the major four parts of the disclosed technology. All four parts can be completely and independently controlled during operation. The right side represents the dynamic axle adjustment mechanism; the top represents the integrated steering mechanism; the middle represents the electric propulsion system; the bottom left represents the wheel and suspension system.

During vehicle operation, the central battery sends power to each of the independent wheel units (100). All the wheel units (100) work simultaneously in real-time to achieve the desired movement and maneuverability of the entire vehicle. An axle slider base (106) bolts on the vehicle base frame (102). An electric linear actuator (108) is mounted on the axle slider base (106). The wheel support frame (104) acts as an inner fender, which protects the internal structure of the wheel unit and is connected to the axle slider base (106) and vehicle frame (102) through a slider hollow rod (110) of the electric linear actuator (108). The electric linear actuator (108) and its slider hollow rod (110) are the major components that achieve the independent axle adjustment of the present disclosure. The details on how the slider hollow rod (110) and electric linear actuator (108) work will be explained in the next several figures.

Since the independent axle (110, 108) connects the wheel support frame (104) to the vehicle frame (102) rather than between each set of wheels (e.g. left and right wheels), this effectively makes a virtual axle. It holds the wheel in certain positions, but would not roll the wheel. The electric linear actuator (108) extends or retracts to change the distance from the attached wheel support frame (104) to the axle slider base (106). A sliding axle motor is located at one end of the electric linear actuator (108); this motor drives the movement of the electric linear actuator (108). By controlling each electric linear actuator (108), the virtual axle length, which is equivalent to the distance between the vehicle body and corresponding wheel, can be fully adjusted and detected. This adjustment ultimately changes the vehicle's track width. The independent axle (110, 108) is the key to achieve dynamic axle extension or retraction, adaptive obstacle avoidance, and other advanced features of the present disclosure. It also plays a first key role in the vehicle's transformative turning. These details will be further discussed in FIG. 4 and FIG. 5 below.

An independent steering system is located at the top of the wheel unit (100). All the components are placed within a steering hollow shaft (118), which is embedded in the wheel support frame (104). Because of this, the independent steering system has an extremely low profile compared to other existing designs and solutions on the market. The height of the independent steering module is approximately half of all other technologies and products.

A steering internal gear (114) is mounted on top of the wheel support frame (104). This component is fixed and does not move with the wheel during steering. A steering motor (116), located inside the steering hollow shaft (118), provides controlled torque to a pinion (112). The pinion (112) rotates against the teeth of the steering internal gear (114). The steering motor is a gear motor which acts as the first stage speed reduction, the pinon and internal gear are engaged as the second speed reducer. Due to the internal gear is mounted on the frame (104), once the pinon rolls on it, it causes the steering motor (116), hollow shaft (118), and all parts attached to the hollow shaft (118) swing in the frame. This independent steering mechanism is the key to achieve TAO (Traction Adaptively Optimized) control. More importantly, the independent steering plays a second key role in allowing quicker and sharper turns during transformative turning, where the steering system turns the front wheels in one direction and the rear wheels in the opposite direction—this is known as round steer mode (a.k.a. 4-wheel steer). The details of the low-profile independent steering of the present disclosure will be further discussed in FIG. 9 and FIG. 10 below.

An independent near-wheel propulsion system is located inside the wheel support frame (104) and beside each wheel, which drives the respective wheel forwards or backwards. The independent electrical propulsion motor (124) powers the near-wheel propulsion system. This motor (124) is vertically installed and seated the upper (120) and lower swivel arms (122) for protection. Because of this, the propulsion motor (124) and the rest of the propulsion system rotate together with the wheel during steering. The propulsion motor (124) transmits power and torque to a gear set (128) through a spline (126). The gear set (128) converts the power and torque in a 90-degree direction onto a propulsion shaft (130), which then turns the wheel. The gear set (128) consists of a bevel gear reducer and planetary gears reducer. The independent near-wheel propulsion mechanism plays a third key role in making quicker and sharper turns during transformative turning, where the propulsion torque is distributed optimally to both the inner and outer wheels to allow them to rotate at different speeds. The independent propulsion is also the key to achieving TAO (Traction Adaptively Optimized) control. Each wheel unit also contains an independent braking mechanism, which includes a brake (a.k.a. brake caliper) and a brake disc. So, each wheel can be accelerated or braked independently and differently from one another. The details of the independent propulsion and braking of the present disclosure will be further discussed in FIG. 6 and FIG. 7 below.

A unique independent suspension system is illustrated on the bottom left of FIG. 1. A tire (136) is installed over a wheel rim (138). An in-rim frame (132) is located inside the rim (138). The propulsion shaft (130) is supported by the in-rim frame (132) in a way that allows the propulsion shaft (130) to rotate freely. A suspension system (134) provides a resilient connection between the in-rim frame (132) and the lower swivel arm (122). So, the vibration from the wheel and in-rim frame (132) is mostly absorbed before reaching the swivel arms (120, 122). On the other side, the spline (126) mentioned above contains a spine shaft and its nut. The spline (126) enables the transfer of horizontal rotation power and torque; it also allows free vertical movement between the propulsion motor (124) and the gear set (128). This spline (126) system working smoothly together with the suspension system (134) located inside the rim is the key to achieving the independent suspension of the present disclosure. The suspension system (134) plays a key role in stabilizing the vehicle during transformative turning and independently adjusting the heights of the individual suspensions (134) in order to offset the center of gravity to the inner wheel side as the vehicle body tilts. The suspension system (134) and how it makes the vehicle body tilt will be further explained in detail in the following paragraphs for FIG. 8 and FIG. 11.

The suspension system (134) supports the propulsion motor (124) as sprung mass, propulsion motor (124) is seated in the lower swivel arm (122) and transfer torque to gear set (128) via the spline (126). This design of the present disclosure greatly reduces the unsprung mass of the vehicle compared to the existing wheel drive solutions; therefore, the design achieves an extremely low-unsprung-mass near-wheel IPASS system. This will be explained in more detail in the upcoming paragraphs as well as FIG. 10.

Vehicles with fully independent electronic control of the axle adjustment, acceleration, braking, steering, and suspension for each wheel have more opportunities for computerized vehicle dynamics such as: 360-degree steering; brake steer, where individual wheel brake bias is adjusted to assist steering; active software differentials, where the individual wheel speed is adjusted in response to other inputs; active brake bias, where the individual wheel brake effort is adjusted in real-time to maintain vehicle stability. As the wheel motor brake and accelerate a vehicle with a single solid-state electrical or electronic system, many of the above features can be added as software upgrades rather than require the installation of additional systems and hardware. This means there is more space in the vehicle, and the weight and manufacturing costs are reduced. Therefore, an active, dynamic safety system can be made at a reasonable cost for road vehicles equipped with this type of wheel motor.

Theoretically, the independently steered wheel unit can have a 360-degree or more turning ability. In reality, a wheel does not need to go beyond 360 degrees. In one alternative embodiment of the present disclosure, the wheel only provides a turning ability of up to 180 degrees (+/−90 degrees), which can be programmed to switch direction as needed in real-time. This is effectively equivalent to a full 360-degree turning wheel. Overall, a true 360-degree steering ability or comparable equivalent provides exceptional vehicle maneuverability. The aforementioned steering mechanism, combined with hydraulic ride-height control, can enable 'kneeling' for stepless curb-to-vehicle access. The fully integrated near-wheel motor can deliver power with maximum efficiency. In addition, a physical wheel alignment is not required by individual steering design. Using a single uniform wheel module in the vehicle design makes it easier to use, and provides better performance. Each module is standard across all corners of the vehicle, which enables front, rear, and side access into the vehicle.

The aforementioned electric motors are connected to the main battery by wires; the main battery transmits electrical power to the motors instantaneously based on the driver's command and input. By substituting some of the mechanical components with wires, the weight of the vehicle can be reduced, and the vehicle is easier to control. Furthermore, all wheel units (100) work coordinately ensures the versatile control demand. Since the wheel units are independent, each independent system operates at a different rate. Examples may include, but are not limited to: (1) how much the electric linear actuator (108) pushes or pulls each wheel support frame (104) for track width adjustment; (2) the degree that each pinion (112) of each unit must rotate during steering; (3) how much the gear set (128) creates the rotational force during propulsion and transformative turning, (4) the height of each suspension (134) when the vehicle body tilts during a sharp maneuver (i.e. transformative turning), and etc.

Even without consideration of the passenger and cargo weights, vehicles with a higher center of gravity are more difficult to control. This means that the vehicle might not be able to maneuver at sharp angles without risk of rolling over, which is especially important when driving on at high speed with a sharp turn. The independent suspensions (134) of the present disclosure can adjust each wheel's height individually, which causes the vehicle body to tilt and thus shift its center of gravity to the side of inner turning wheels during the turn. The center of gravity biasing increases the stability of the vehicle, which is important when doing sharp and quick turns. This will be explained further in FIG. 5.

Figure 2:
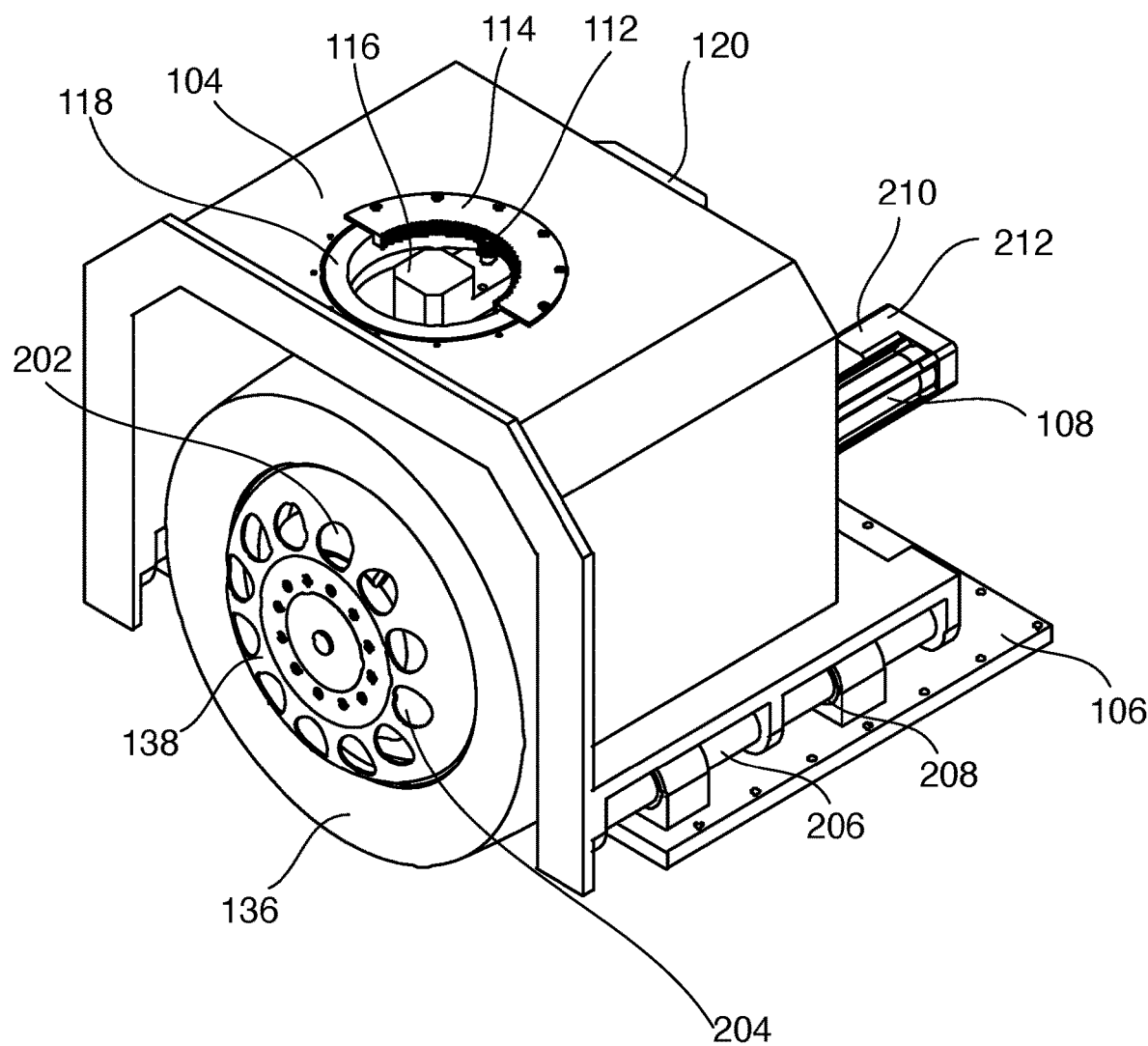
FIG. 2 illustrates a top isometric view of the electric wheel unit for the left front wheel pertaining to the present disclosure.

FIG. 2 illustrates a top left isometric view of the electric wheel unit (100) for the left front wheel of an IPASS vehicle. The tire (136) and rim (138) of the wheel are mounted over the propulsion shaft (130); this will be explained in detail in further paragraphs and FIG. 6. The figure briefly illustrates the brake (202) and brake disc (204), which are covered by the rim (138). As noted in FIG. 1, the wheel support frame (104) covers the internal components of the wheel unit (100). FIG. 2 also illustrates a sliding axle shaft (206) between one side of the wheel support frame (104) and the axle slider base (106). The electric linear actuator (108) pushes or pulls the wheel support frame (104) to adjust the track width. The sliding axle shafts (206) are mounted on the frame (104). The sliding ball bushings (208) are located along the openings of the axle slider base (106), and reduce friction from the movement of the sliding axle shaft (206) as the wheel support frame (104) moves. By pushing the wheel support frame (104) rather than the wheel itself, the components of the independent steering system are protected from exposure during vehicle movement. The linear actuator housing (212) houses and protects the components of the electric linear actuator (108) as it moves as part of the independent axle. The linear actuator housing (212) also protects the sliding axle motor (210).

The steering system in FIG. 2 is on top of the wheel support frame (104). As noted earlier, the pinion (112), which is powered by a steering motor (116), is engaged with the steering internal gear (114) to turn the upper swivel arm (120), and thus steer the wheel in the desired direction. The steering internal gear (114) sits on the top of the wheel support frame (104). The pinion (112) and steering motor (116) are all located inside the steering hollow shaft (118). Therefore, the height of the whole independent steering system of the present disclosure is almost equal to that of the steering hollow shaft (118). This design results in an extremely low-profile near-wheel independent steering system. Further details of the steering system will be explained in later paragraphs and FIG. 9.

Figure 3:
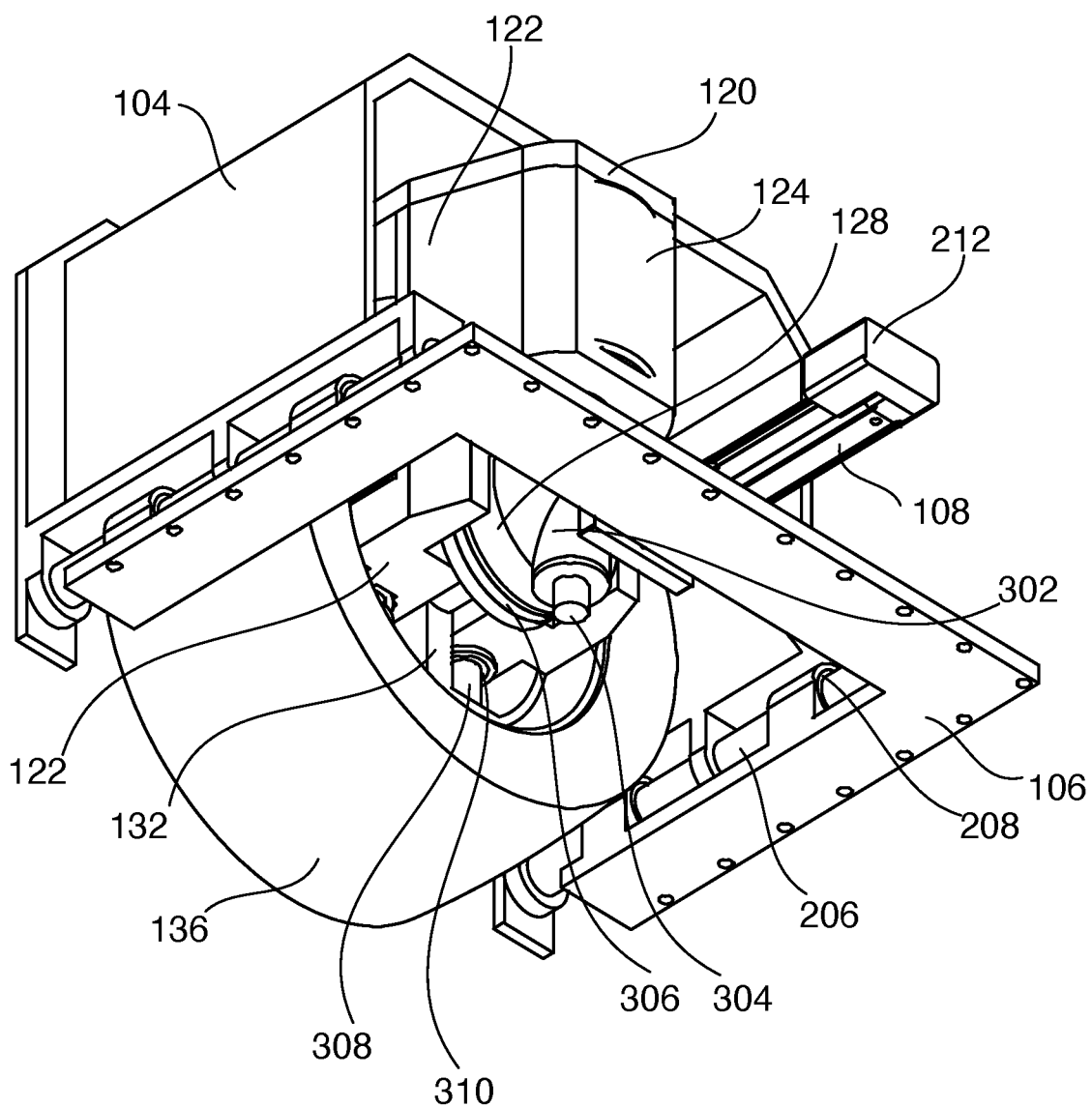
FIG. 3 illustrates a bottom isometric view of the electric wheel unit for the left front wheel pertaining to the present disclosure.

FIG. 3 illustrates a bottom right isometric view of the electric wheel unit (100) for the left front wheel of a vehicle. The descriptions of the wheel unit in FIG. 2, excluding the steering system, also apply here. However, FIG. 3 also partially illustrates the propulsion and suspension system in minor detail. The propulsion motor (124) is attached to the upper (120) and lower swivel arms (122) of the steering system. The steering system turns the upper (120) and lower swivel arms (122) and parts of the propulsion, braking, suspension system. This will be observed again in FIG. 10. FIG. 3 also illustrates the exterior portion of the gear set (128) which consist of bevel gear reducer (302) and planetary gear reducer (306). bevel gear reducer cap (304) seals and protects gears and spline shaft (608). Further details of the propulsion system will be explained in later paragraphs and in FIGS. 6 and 7. A suspension shaft (308) slides into the lower swivel arm (122). The suspension ball bushing (310) is placed between the suspension shaft (308) and the lower swivel arm (122), which reduces friction from the vertical movement between the suspension shaft (308) and the lower swivel arm (122). Further details of the suspension system will be explained in later paragraphs and in FIG. 11.

Figure 4:
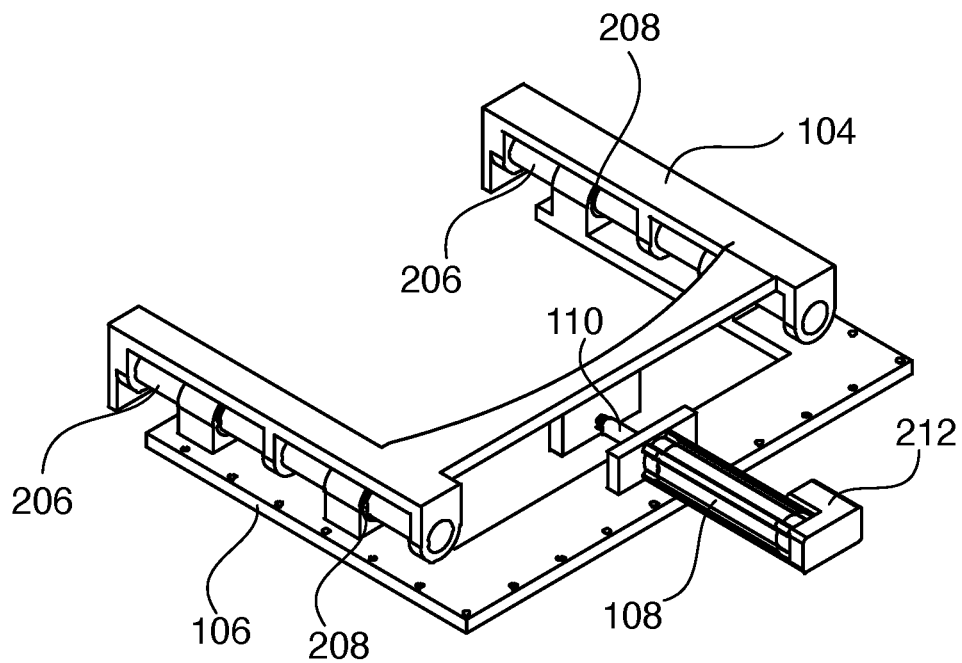
FIG. 4 illustrates isometric views of an exemplary embodiment of the independent axle adjustment system for the left front wheel pertaining to the present disclosure.
Figure 4:
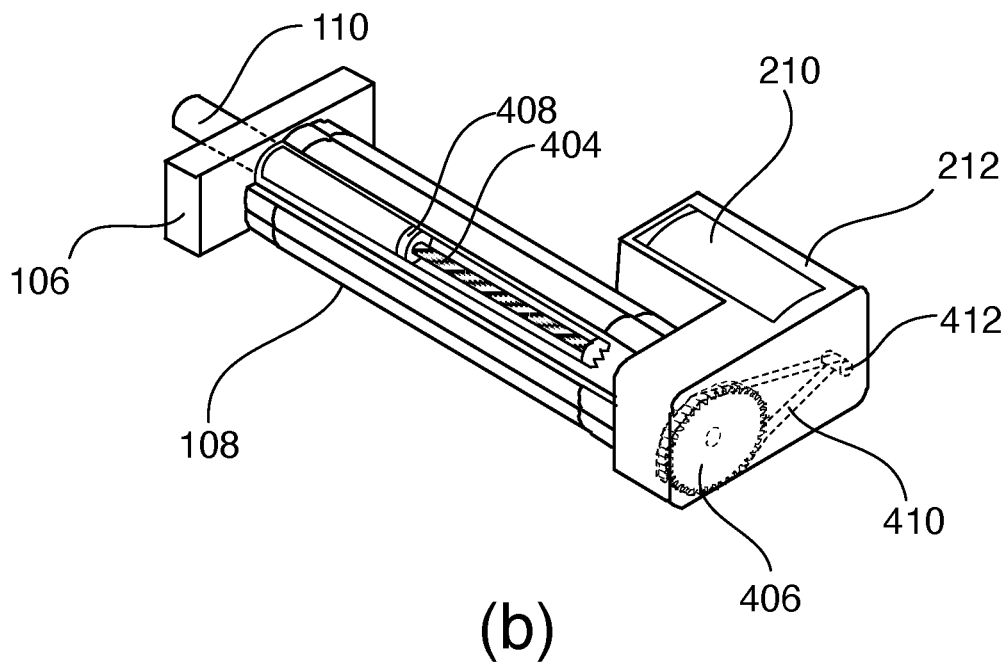

FIG. 4 illustrates isometric views of an exemplary embodiment of the independent axle adjustment system for the left front wheel of the present disclosure. Sub-figure (a) shows the entire independent axle adjustment mechanism. The axle slider base (106) is connected to the wheel support frame (104) via sliding axle shafts (206) and the sliding bushings (208). The sliding bushings (208) reduce friction from the movement between the sliding shafts (206) and the axle slider base (106). This movement is enabled by the electric linear actuator (108). The actuator (108) uses a sliding axle motor (210) to drive the slider hollow rod (110) to provide linear movement of the wheel support frame (104). The sliding axle motor (210) is protected by the linear actuator housing (212).

Sub-figure (b) illustrates a isometric cross-section view of the electric linear actuator (108) in one exemplary embodiment of the present disclosure. All descriptions of the electric linear actuator (108) in Sub-figure (a) also apply here. The slider hollow rod (110) and the sliding axle motor (210) are all encased in the linear actuator housing (212). A ball screw (404) rotates inside the linear actuator housing (212) and pushes the slider hollow rod (110) via a ball nut (408) which is attached to the slider hollow rod (110). This movement is powered by the rotation of the driven pulley (406). A drive pulley (412), powered by the sliding axle motor (210), rolls the driven pulley (406) via a timing belt (410). The sliding axle motor (210) powers the electric linear actuator (108), in order to push or pull the axle wheel support frame (104). The rotational movements of the ball screw are converted into the linear push or pull movements of the slider hollow rod (110). These movements of the slider hollow rod (110) eventually push or pull the wheel support frame (104). The zero-backlash ball screw assembly is the key of precise leaner motion.

In an alternative embodiment, an acme screw pushes the cylindrical shaft instead of the ball screw (404). Some of the advantages of acme screw assemblies include lack of noise, reduced backlash, lower cost, self-locking, etc. However, the acme screw assembly has a higher friction than that of the ball screw assembly.

In other embodiments of the present disclosure, the ball screw assembly used for the actuator's mechanical movements is replaced with different ways, such as rack and pinion assembly, pulley and timing belt assembly or pulley and chain assembly.

The electric linear actuators are optimized for the independent axle usage of the present disclosure, as they can move the wheel support frame (104) with high precise position control. Other benefits include, but are not limited to: high efficiency, low profile, low maintenance, long service life, and easy installation. In another embodiment of the present disclosure, the electric linear actuator (108) is replaced with a hydraulic actuator. A hydraulic actuator can produce a large amount of pressure and is better suited for heavy-duty applications. However, it requires additional components such as a hydraulic tank and high-pressure pump, valves, and piping. These extra components take up more space and increase the mass of the vehicle. Furthermore, hydraulic actuators need the additional sensor and controlling system for precise positioning.

Figure 5:
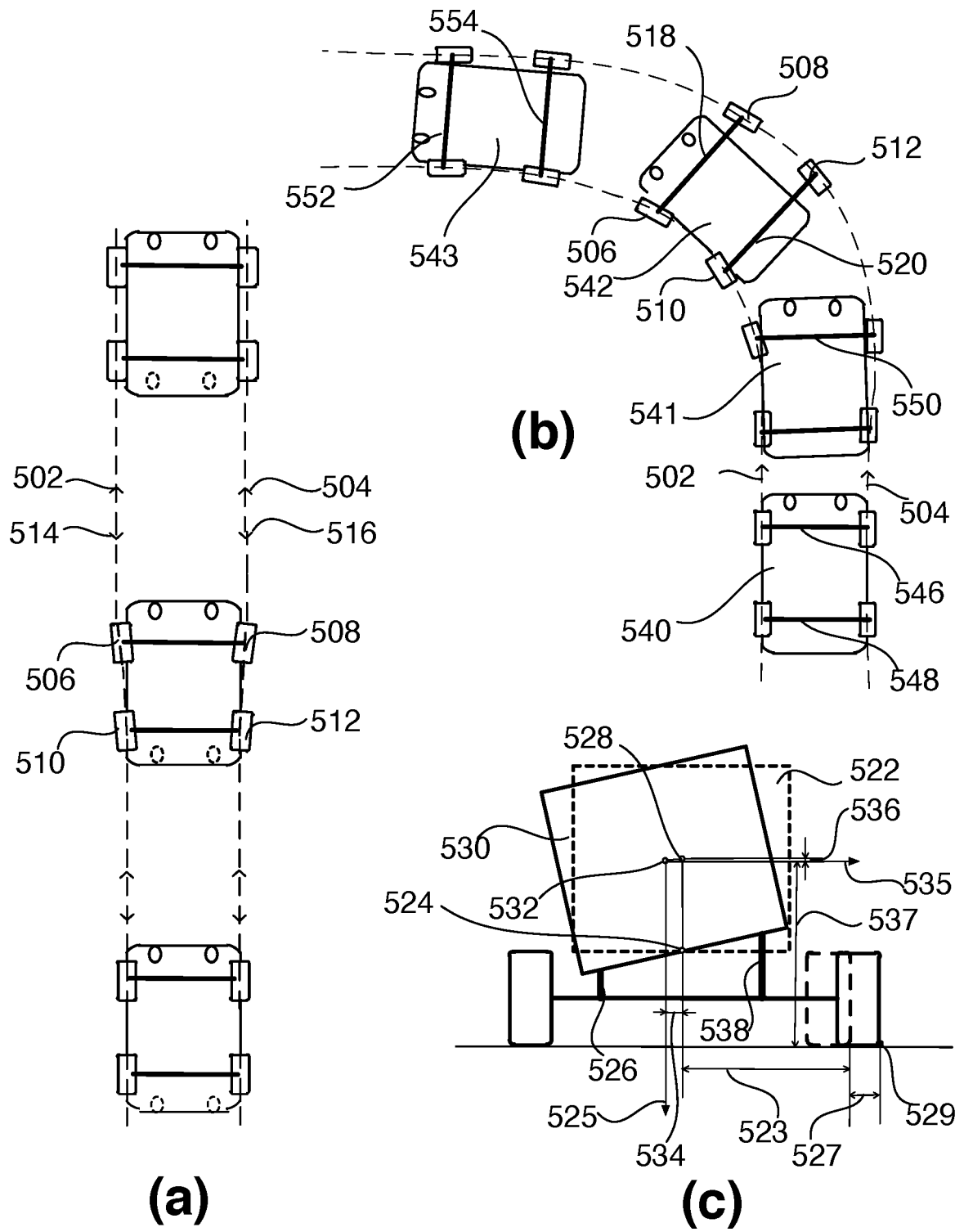
FIG. 5 illustrates the exemplary processes of the wheel axles extending and retracting using the independent axle adjustment feature to adjust the track width during the vehicle movement and how a transformative turn is achieved.

FIG. 5 illustrates the exemplary processes of the wheel axles extending and retracting using the independent axle adjustment feature to adjust the track width as the vehicle moves forward. The figure also illustrates the application of the independent axles and the direction that the wheels are pointing as the vehicle is turning left. It also illustrates the tilt of the vehicle body as the track width extends via axle adjustment during a turn. Both Sub-figure (b) and (c) illustrate an example of the transformative turn of the present disclosure.

Sub-figure (a) illustrates the basic extending and retracting operations of the independent axle adjustment of the present disclosure. The distances between the vehicle's left front wheel (506), left rear wheel (510), right front wheel (508), and right rear wheel (512) from the vehicle body frame can be independently adjusted. This is equivalent to adjusting their virtual axle lengths or track widths. During a virtual axle extension, the virtual wheel axle width increases when the vehicle drives forward (from bottom to top). All the wheels (506, 508, 510, 512) are turning outwards (relative to the vehicle body). We call the wheels (506, 508, 510, 512) enter a toe-out formation. As the wheels move outwards while going forward, the left (502) and right wheel trajectories (504) also change accordingly as shown; the narrow tracks change to wider tracks. The opposite happens when extended wheels (506, 508, 510, 512) retract; the wheels turn inwards while the vehicle is moving and enter a toe-in formation. As the wheels retract inwards, the left (516) and right wheel trajectories (514) also change accordingly; the wide tracks transform back to narrower tracks.

Sub-figure (a) only illustrates a typical embodiment of the present disclosure when the wheels (506, 508, 510, 512) on both sides of the vehicle are toeing symmetrically. Since all the wheels (506, 508, 510, 512) can be steered independently in the IPASS design of the present disclosure, the trajectory of each wheel may also be different and asymmetrical. In the asymmetrical cases, we hereafter still call a single wheel be in-toeing or out-toeing or in a toe-in or toe-out formation as if there is another symmetrical wheel to match it. The precise and real-time toe adjustment is made by briefly turning each wheel and then straightening them soon after.

The widening or narrowing of the virtual wheel axles, also called dynamic axle extension and retraction, can be applied to various applications. For example, when the vehicle is driving fast in winds, off-road, when the terrain is bumpy and uneven. By widening the wheel axles, the vehicle is less likely to roll over. Furthermore, the driver will have an easier time handling the vehicle. The dynamic axle, along with the independent propulsion, steering, and suspension, is particularly useful for a novel transformative turn noted in the present disclosure. The transformative turn is a method to implement a difficult turn in a fast and safe way by optimizing and using all the IPASS components. It gets its name from the fact that the turning vehicle undergoes a sequence of transformations in shape, structure, and/or dimensions. This detail will be elaborated on in Sub-figure (b) and (c) below.

Sub-figure (b) illustrates a vehicle that is making a left transformative turn in a typical embodiment of the present disclosure. The vehicle at the initial position (540) starts to move forward to the front and rear virtual axles fully retracted (546, 548), the front wheels (506, 508) and the rear wheels (510, 512) are in their original position. To make a traction adaptively optimized turn, the vehicle will perform the following transformations: (1) extend the front and rear virtual tracks to the right side of the vehicle for better safety and turning performance; (2) constantly steer each wheel independently in their optimal directions; (3) constantly provide the optimal driving torque to each wheel and maintain them in their optimal rotating speeds independently; (4) control the independent suspension to tilt the vehicle body to the left side for better safety and turning performance.

To start the transformative turning, the vehicle continues with the position (541). All the rear wheels (510, 512) are still in their initial orientations and the rear virtual track widths (546, 548). However, the left front wheel (506) starts to turn left and the right front wheel (508) starts to extend its axle though keeps its original direction yet. The newly extended virtual track is now (550). At the same time, the independent suspension also works to tilt the vehicle body during the transformative turning, which will be explained in Sub-figure (c).

The vehicle continues to go forward at the middle position (542) of the left transformative turning. Now both the independent axles linked to the outer wheels (508, 512) extend outwards, while the inner axles and wheels (506, 510) do not change. This action extends both the new front and rear virtual axles (518, 520) and increases the track width of the vehicle to a maximum position of the transformative turning. At this time, the outer front wheel (508) receives greater torque and turns left at a faster speed, while the outer rear wheel (512) also receives greater torque and turns right at a faster speed. The inner wheels (506, 510) receive less torque and turn at smaller angles at slower speeds. The inner front wheel (506) turns left, while the inner rear wheel (510) turns right. At the same time, the left (502) and right wheel trajectories (504) also change accordingly to a widened state, as shown in Sub-figure (b). The front wheels (506) and (508) are turning parallel to each other and have the same steering directions. Similarly, the rear wheels (510) and (512) are also parallel to each other and have the same steering direction. Because the front wheels (506, 508) turn in the opposite direction of the rear wheels (510, 512), the vehicle in the middle position (542) enters round-steer mode (a.k.a. 4-wheel steer). Therefore, the turn can be completed more efficiently. The optimal rotation torques and speeds constantly received by each wheel can also enable the turn to be completed faster, safer, or along a shorter travelling path. So, with the same turning performance, the vehicle is now capable of performing much more difficult turns, including a much sharper turn or a turn on more difficult terrain.

The vehicle then finishes its turn at the close-to-the-end position (543); the virtual axles retract, which pull the outer wheels (508, 512) towards the vehicle. At the same time, the wheels (506, 508, 510, 512) straighten out and eventually return to their original directions and positions. The front wheels (506, 508) will retract earlier than the rear wheels (510, 512). The retracted front virtual track is (552) and the retracted rear virtual track is (554).

Since the IPASS wheels are independent, in yet another embodiment of the present disclosure, the angle of the vehicle body during a transformative turn will determine how much the axles extend and the amount that the steering system turns each wheel. The trajectory of each wheel may also vary and be completely irregular compared to the example shown in Sub-figure (b).

Sub-figure (c) illustrates the vehicle body tilting as it makes a left transformative turn, as explained in Sub-figure (b). During the left turning movement from the starting (541), middle (542), and close-to-the-end position (543), the vehicle body tilts to a different angled position (530) from its initial upright position (522). It starts with a slight tilting at the position (541), the biggest tilting at the position (542), and returns to a slight tilting at the position (543). The tilting movement is achieved by charging or discharging hydraulic oil of the independent suspension cylinder of each wheel unit. The different hydraulic oil volume causes each of the suspensions to have a different height from the ground. For example, in Sub-figure (c), the height of the suspension of the inner wheel (526) decreases by 100 mm from its default height, while the height of the suspension of the outer wheel (538) increases by 100 mm from its default height; therefore, the total height difference from the right wheel (538) to the left wheel (526) is 200 mm. Such tilting is around the center pivot point (524). As the vehicle tilts to the angled position (530), its initial center of gravity (528) moves to a lower position (532) on the left side. There is now a horizontal offset (534) and a vertical offset (536). The vertical offset (536) is how much the vehicle lowers its center of gravity from tilting, and the horizontal offset (534) is how much the vehicle shifts its center of gravity towards the turning center on the left. This horizontal shifting distance (534) has a similar effect to that of an axle extension of the outer wheels to the right. As described in Sub-figure (b), the outer wheel (508, 512) axles are fully extended out on the right side of the vehicle. This extended length is shown as (527) in Sub-figure (c). With the horizontal shifting (534) of the center of gravity due to tilting and the extension of the outer wheel axles (527), the total equivalent axle extension E is the summation of (534) and (527).

The tilting and axle extension of the wheel unit are both designed to greatly improve the vehicle's stability and prevent it from rolling over easily during a transformative turn—particularly when the vehicle needs to make a sharp or sudden maneuver on difficult terrain. During such turns, the condition of the vehicle to roll over around an outer pivot point (529) is when the torsional moment of the centrifugal force (535) is greater than that of the gravitational force (525). This can be defined as the following:

$$F \cdot H > G \cdot L$$

where F is the centrifugal force (535) from the turning, H is the moment arm of centrifugal force (535), which equals to the height of vehicle's center of gravity (i.e. the distance between the vehicle's center of gravity and the ground surface), G is the gravitational force (525), L is the moment arm of gravitational force (525). The centrifugal force F is calculated as the following:

$$F = m \cdot v^2 / r$$

where m is the vehicle mass, v is the velocity of the vehicle during the turn, and r is the turning radius. G=m·g, where g is gravitational acceleration, a constant that equals to 9.81 m/s². So, combining the above two formulas, the condition of the vehicle rolling over is now modified to the following:

$$H/L > g \cdot r / v^2$$

Therefore, at a certain speed (v) and turning radius (r), $g \cdot r / v^2$ is a fix value, a smaller H and larger L help prevent the vehicle from rolling over. L equals to half of the track width (W) plus the total equivalent arm extension E, which is, L=W/2+E. Without tiling and axle extension, E is 0. With tilting and axle extension, E is the sum of horizontal shifting distance (534) and the axle extended length (527). Using the independent suspension and axle extension during transformative turning can decrease H and increase L. As a result, the vehicle is less likely to roll over. Since the independent suspension tilts the vehicle body and the independent axle extends the vehicle tracks during transformative turning—that is, with a smaller H and larger E—the vehicle can now finish the turn with a larger v or a smaller r (or both), even on difficult terrains. A larger v means the vehicle is turning quicker; a smaller r means the vehicle is turning at a sharper angle. In this way, the new transformative turning can greatly improve the vehicle's stability and prevent it from rolling over easily. A transformative turn is especially useful when the vehicle needs to make a sharp or sudden maneuver on difficult terrain.

Another application of the dynamic axle is adaptive obstacle avoidance, which is also performed with the independent steering system. Adaptive obstacle avoidance involves detecting an obstacle at a single spot in real-time; Such obstacle can be a real object on the ground or a ditch, defect, puddle, and etc. The obstacle may also be a virtual object or region that the central vehicle controller wants to avoid. The independent control of each wheel allows the affected wheel(s) to avoid said obstacle by briefly widening or narrowing the wheel axle. Although the suspension is effective in this situation, being able to prevent the shock from the obstacle entirely can help preserve the service life of the wheel unit and vehicle. It is especially useful in sudden instances when it is undesirable to steer the vehicle away to avoid the obstacle, or when the obstacle is large. Adaptive obstacle avoidance results in a more stabilized driving experience than traditional steering avoidance.

Adaptive obstacle avoidance can also help stabilize the vehicle during transformative turning and tilting, especially on uneven terrain. Various elevations may affect the height of the center of gravity, which may affect the centrifugal force acting on the vehicle. This is further complicated if the wheel rolls on top of an obstacle (e.g. rock, debris, a small hill, etc.), which affects the effective track width of the vehicle and the height of the center of gravity. Depending on the direction of the turn and the initial tilt due to the obstacle, the vehicle may be even more prone to roll over. The suspensions (526, 538) typically ensure that the tires maintain traction on the ground surface; however, turning in such a situation may further strain the suspensions, reducing their effective service life. Adaptive obstacle avoidance can ensure that the wheels travel on relatively even ground in this situation.

Another example of the dynamic axle's application involves parking. If the wheels are in a widened-axle state, narrowing all the axles will let the vehicle fit in an allotted parking space. In the case of parallel parking, the wheels do not protrude to the side of the road with moving vehicles.

Figure 6:
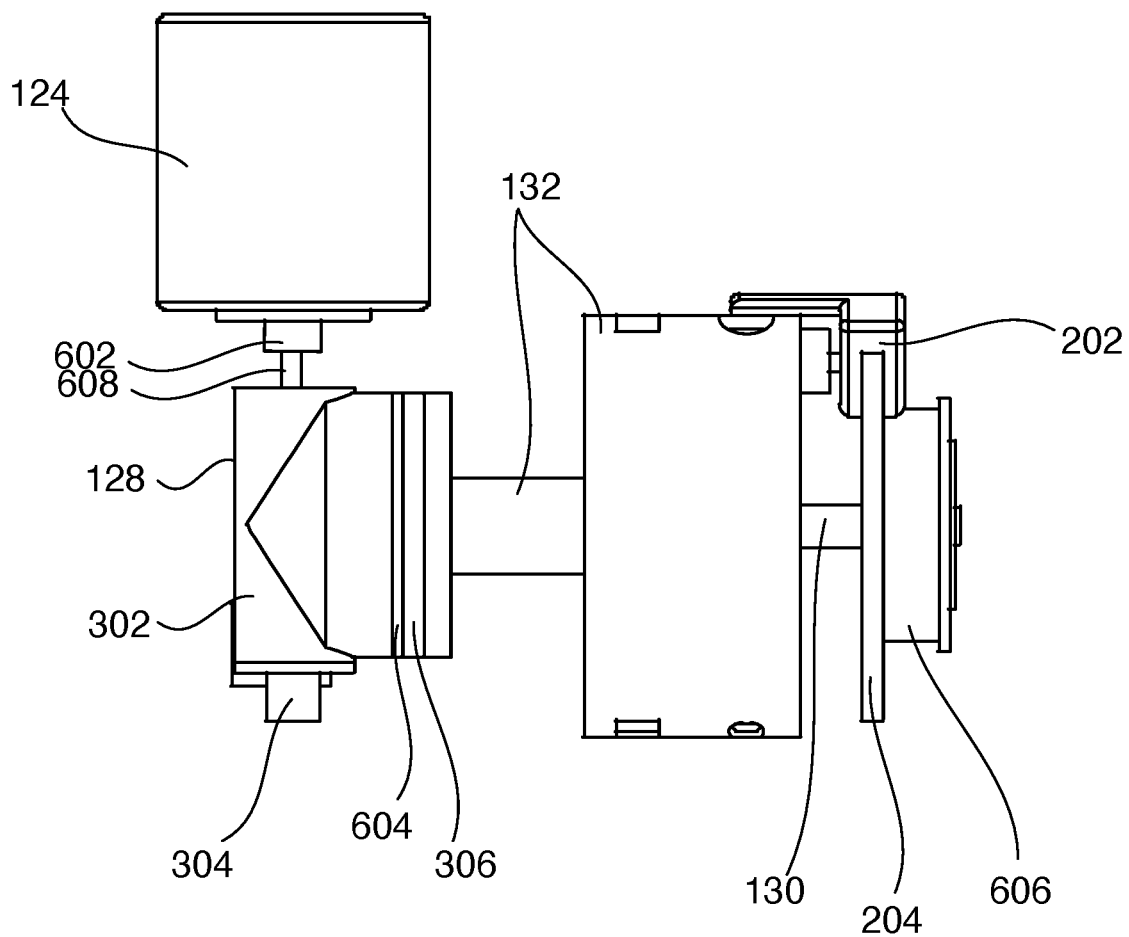
FIG. 6 illustrates a front view of the independent propulsion system for the front left wheel pertaining to the present disclosure.

FIG. 6 illustrates a front view of the independent propulsion system of the present disclosure. This particular propulsion system is illustrated with the front view of the front left wheel in mind, provided that the vehicle is installed with four independent wheel units. The propulsion motor (124) drives the propulsion system via drive-by-wire technology. The propulsion motor (124) shaft and the spline shaft (608) are joined by a coupling (602). It absorbs misalignment between the propulsion motor (124) shaft and the spline shaft (608). The propulsion motor (124) in a vertical position prompts the spline (126) to rotate horizontally. The vehicle driver controls the rotational rate of the motor (124), and naturally, the spline's (126) rotation as well. The spline (126) drives the gear system (128). The gear ratio determines how fast the propulsion shaft (130) and the wheel itself are rotating. In an EV, the high range of RPM with moderate torque can be achieved by the motor drive electrically. The bevel gear reducer (302) and sealed with a bevel gear reducer cap (304). The bevel gear reducer (302) is situated adjacent to the planetary gear reducer (306), with a planetary gear reducer cap (604) to bridge the two reducers.

The planetary gear reducer (306) rotates the propulsion shaft (130), and as a result, also rotates the wheel. The power from the spline (126) is transferred to bevel gear reducer (302) and planetary gear reducer (306) is then transferred into rotational motion in a 90-degree direction via the propulsion shaft in order to rotate the wheel. The wheel hub (606) connects the wheel to the propulsion shaft (130).

The brake (202) is mounted on the in-rim frame (132) and brake disc (204) is attached to the wheel hub (606). These components absorb the kinetic energy and slow down the rotation of the wheel by applying friction force, eventually holding the wheel stationary. It does this when the brake (202) clamps on to the brake disc (204). However, a considerable amount of kinetic energy is typically lost via heat dissipation. Considering that the wheel unit pertains to an electric vehicle, in one of the embodiments of the present disclosure, the wheel unit (100) may use regenerative braking, which helps convert some of the lost kinetic energy into electricity.

The propulsion motor (124) in the present disclosure is attached to the upper and lower swivel arms of the independent wheel unit, which are supported by the suspension and all considered part of the sprung mass of the vehicle. Therefore, the unsprung mass of the vehicle is reduced. This design consideration solves an on-going issue that existing independent wheel unit designs face. This will be explained in detail in later paragraphs and in FIG. 10. However, one ordinarily skilled in the art can see that a vehicle with low-unsprung-mass will improve handling and ride quality.

As the vehicle is steered, the rate of the propulsion system's operation is adjusted to accommodate the vehicle safely. As noted before, the propulsion system moves in the direction that the upper and lower swivel arms turn. During transformative turning, the steering system of each unit turns the wheel of the vehicle to enter round steer mode. The propulsion system distributes propulsion torque to the individual wheels to accommodate the turn, which affects the rotation speed of the wheels. During transformative turning, the outer wheels typically rotate at a faster speed and higher torque than the inner wheels. The propulsion torque applied to the wheel is further affected when the independent axles extend the outer wheels outwards. This stabilizes the vehicle while it is making a quick and sharp turn.

Figure 7:
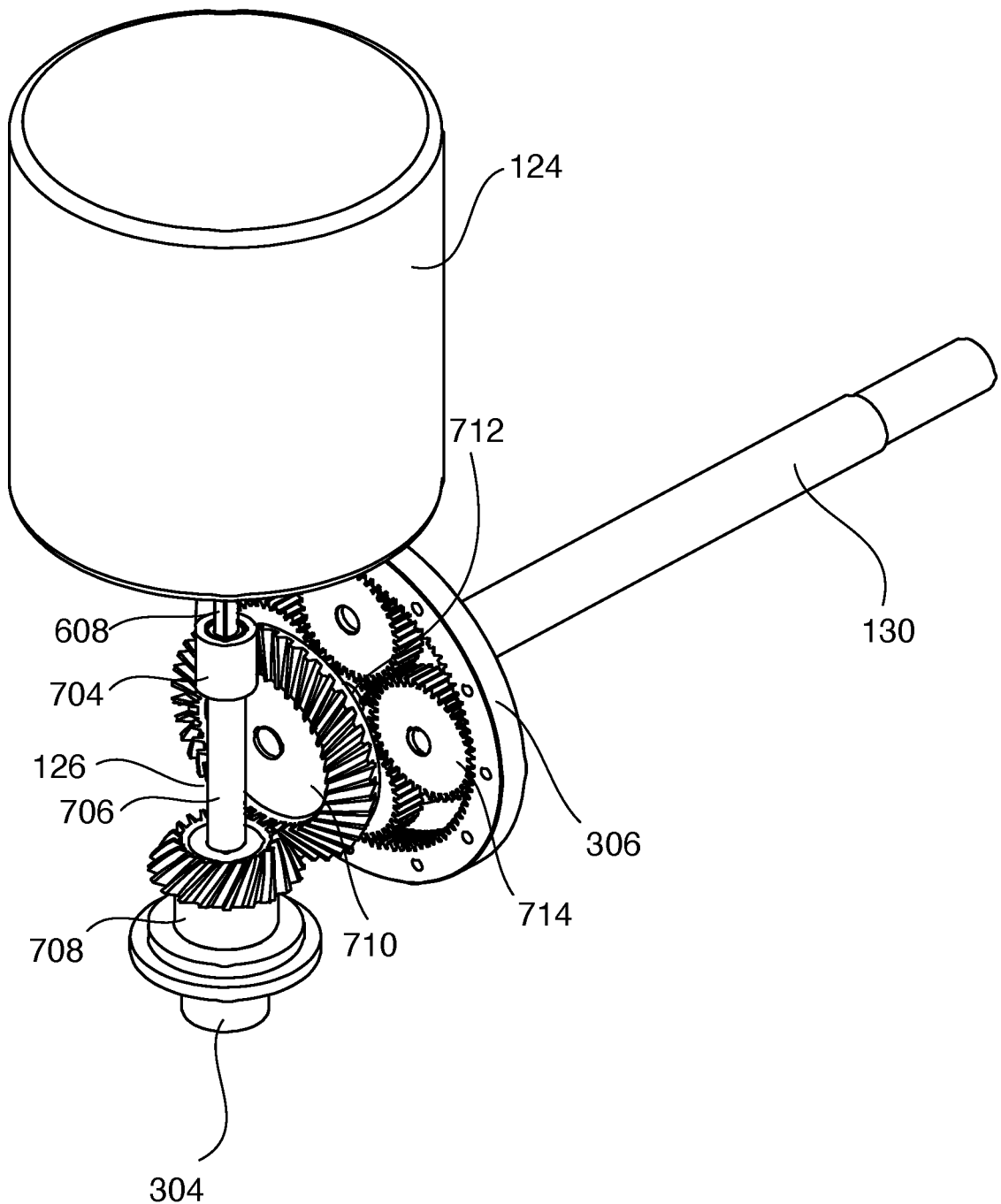
FIG. 7 illustrates an isometric inside view of an embodiment of the reduction gears and spline shaft that are fundamental to the independent propulsion system pertaining to the present disclosure.

FIG. 7 illustrates a detailed view of the spline shaft and gears involved in the independent propulsion system of the present disclosure. A spline shaft (608) is coupled to the propulsion motor (124). A spline sleeve (706) and the spline shaft (608) are coaxial. A ball spline nut (704) is seated in the spline sleeve (706), It ensures the spline shaft (608) rolls the spline sleeve (706), meanwhile, the spline shaft (608) moves vertically along the spline sleeve (706). The spline sleeve (706) is connected with a bevel gear (708). The drive bevel gear (708) rolls a driven bevel gear (710) via engaged teeth. These two bevel gears (708, 710) transfer rotation power from the horizontal to the vertical direction. Because each wheel operates independently without a physical mechanic differential, the equivalent differential acts as a virtual differential or electronic differential, which can be arbitrarily determined by a center control program. The independent torque to each wheel allows additional capabilities (e.g., traction control, stability control). And the torque is not limited by the wheel with less traction, as it is with a mechanical differential. This is particularly important because a vehicle with this wheel unit can drive each wheel at a different and independent speed, torque, and direction.

Due to the drive bevel gear (708) is smaller the driven bevel gear (710), with the teeth engage, the drive bevel gear (708) rolls faster than the driven bevel gear (710). The drive (708) and driven (710) bevel gears, a gear reducer housing (302) and a gear reducer cap (304) compose a speed reducer to roll a sun gear (712) against a number of moon gears (714) in the planetary gear reducer (306). The bevel gear (708) is the first stage reducer and the planetary gear (306) is the second stage reducer. The compound ratio is about 1:10 depends on the motor maximum RPM, the wheel diameter, the maximum speed etc.

The drive (708) and driven (710) bevel gears have a helical design. In another embodiment of the present disclosure, the bevel gears have a straight-cut or spur-cut design. However, the straight-cut design is considered noisier and is more susceptible to vibrations compared to the helical design, which may impact the performance of the other independent systems.

In yet another embodiment of the present disclosure, the bevel gears of the propulsion system are replaced with a worm gear design. In this case, the drive bevel gear (708) is replaced with a screw or worm, which meshes with a spur gear that takes on the role of the driven bevel gear (710). In this case, the worm gears can break a higher ratio, which causes a greater reduction in speeds. However, modifications to the propulsion system may also be required because the worm gear and spur do not intersect on a perpendicular plane like the bevel gears. Also, worm gears are considered less efficient and generate more heat from point contact friction, which may affect the function and service life of any of the adjacent components of the propulsion system. Worm gears also tend to have a higher deficiency rate. In addition, the naturally self-locking feature prevents the worm gear usage in a vehicle propulsion system. It makes the vehicle hard to be coasting.

EV commonly uses a single ratio transmission or direct drive because electric motors can spin at Wide range of RPM by adjusting the power supply, while combustible engines can only do so a narrow range of RPM with reasonable torque and efficiency, so they need a multi-ratio transmission to ensure the wheel has a wide range of speed with better torque and fuel efficiency. But the multi-ratio transmission reduces the efficiency of energy transmission, also, an electric motor has a higher energy conversion efficiency than a combustible engine. As a result, the electric motor is more efficient in delivering maximum torque instantly without the need for the gears to change ratios. By sticking with a single ratio transmission, this reduces the need for additional parts in the vehicle and is more cost-effective for production. The lack of extra parts also helps make the vehicle lighter and more compact, leaving more passenger and cargo space, as well as allowing better design flexibility.

As described above, independent propulsion for each wheel is the key to real all-wheel drive (AWD). Real AWD is different from the existing all-wheel drive and four-wheel drive (4WD). The existing all-wheel drive has a drivetrain that employs a front, rear, and center differential to provide power to all four wheels of a vehicle. The existing 4WD has a drivetrain that uses two differentials and a transfer case to provide power to all four wheels of a vehicle. Commonly, the existing all-wheel drive is found on cars and crossovers, while 4WD is found on trucks. Real AWD is the one described in the present disclosure, where every wheel has a motor individually. Therefore, a real four-wheel vehicle will have four motors that provide power to all four wheels individually.

Real all-wheel drive makes full torque vectoring technology possible. Torque vectoring is a technology used in automobile differentials. In the present disclosure, this is done with the independent steering axle adjustment and propulsion systems. Previous torque vectoring technology provides the differential with the ability to vary the torque to each wheel. This allows the wheels to grip the road for better launch and handling. Previous torque vectoring was implemented in the front and rear differentials; it had a limited ability to provide different torques to the two wheels on the same axle. Previous steering systems use a single rack, turn two wheels on the same axle together, these two wheels are always parallel. It is not complete "vectoring" because the wheels do not have individual directional control. The real all-wheel drive provides torque to each wheel. The torque, steering angle and wheel-to-body position on each wheel are entirely independent and can have arbitrary variation. A real all-wheel drive can provide maximal road-gripping and optimal vehicle handling.

In an alternative embodiment of the present disclosure, an independent braking mechanism is installed in each wheel unit. The brake discs are controlled independently, so the vehicle can brake differently on each wheel to achieve useful effects. This is known as brake-based torque vectoring.

Figure 8:
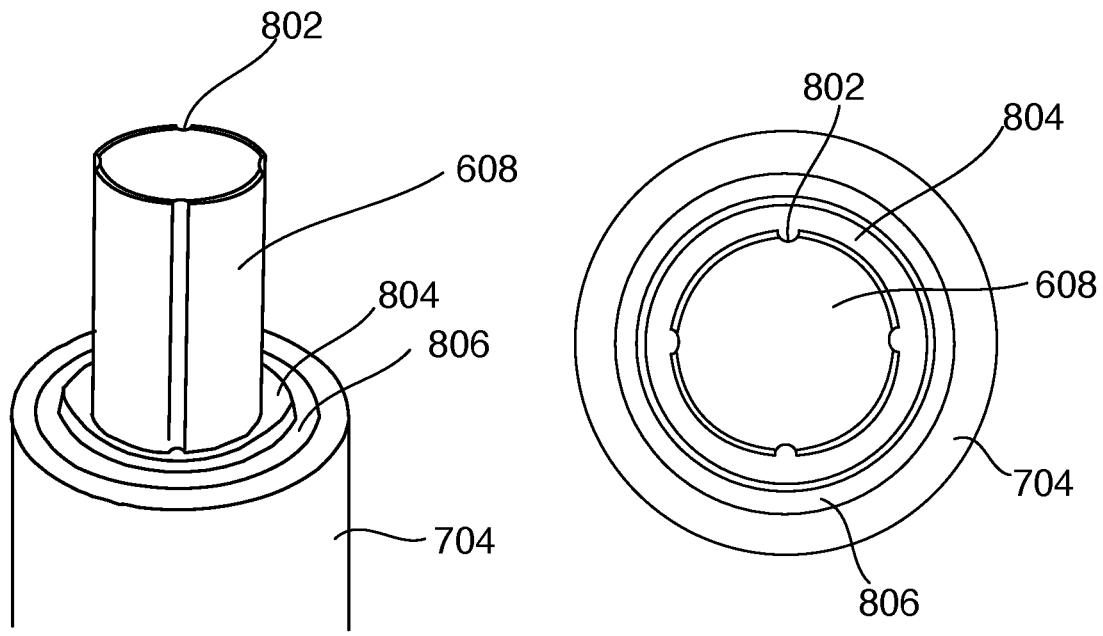
FIG. 8 illustrates a dimetric view, top view, and sectional view of the cross-section of a spline shaft used for the independent propulsion system pertaining to the present disclosure.
Figure 8:
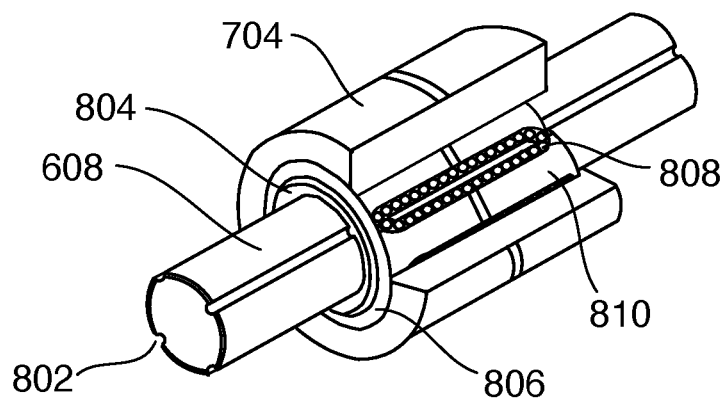

FIG. 8 illustrates a more detailed overview of the spline component (126). Sub-figure (a) illustrates a dimetric view of the top portion of the spline containing the spline shaft (608) and spline shaft nut (704). In one exemplary embodiment of the present disclosure, the spline shaft (608) has four slots or grooves (802) that are along opposing rods of the spline shaft (608). The rods and slots are crucial in keeping the spline sleeve (706) and shaft nut (704) rotating in synchronization. The gap between the spline shaft (608) and the spline shaft nut (704) is covered by a seal (804) and a snap ring (806).

Sub-figure (b) illustrates a top cross-section view of the upper portion of the spline; all descriptions of the spline from Sub-figure (a) also apply here. Sub-figure (c) illustrates a dimetric view of the cross-section of a spline shaft nut (704). Balls (808) revolve along the grooves (802) of the spline shaft (608) to allow for movement of the spline shaft nut (704) during propulsion. The balls (808) are kept in place by a retainer (810). The use of these balls (808) to move the spline shaft nut (704) creates frictionless movement (the balls roll), which helps prolong the service life of the spline shaft (608) and helps the gears move seamlessly as the vehicle is moving forward.

In yet another embodiment of the present disclosure, spline shafts (608) with a different design may be used to accomplish the same function. These spline shafts (608) may have a different number of slots or use different types of slots to transfer torque. They may also use a different kind of ball bearing or a different quantity of balls. These variations to the spline shafts (608) may apply better to some applications than others. These unique designs also allow for stronger drives, better sliding ability, transfer of rotational concentricity, adjustment for misalignment, and simultaneous transfer of axial and rotary motion. Some conventional spline shaft designs include: 1) parallel key splines; 2) involute splines; 3) helical splines; 4) serration splines; and 5) crowned splines. PARALLEL KEY SPLINE: The sides of the equally spaced slots are parallel in both the radial and axial directions. In other words, they have a square profile. INVOLUTE: The sides of the shaft are equally spaced but not as tall. The slots have tapered ridges, and the curves have increased strength to decrease stress concentrations. HELICAL: The slots form a helix around the spline shaft. The sides may be parallel or involute. This design can minimize stress concentrations for a stationary joint under a high load, which allows for rotary and linear motion between parts. SERRATION: The sides are equally spaced and form a V shape. CROWNED: The sides resemble that of involute splines, but the slots are modified for angular misalignment.

The openings of the spline shaft nut (704), seal ring (804), and snap ring (806) are typically in a circular shape that accommodates the number of slots (802) pertaining to the spline shaft (608). However, the shape of the openings can also be a rectangle, square, etc. Ultimately, it corresponds with the shape of the spline shaft (608).

In yet another embodiment of the present disclosure, the spline shaft is replaced with a key shaft. This design is not optimal in heavier duty applications due to its reduced torque transmitting capacity; thus, it is frailer than a spline shaft. Spline shafts are the preferred design because the transfer of torque is more uniform and provides an equally distributed load to the gears. Therefore, the use of spline shafts lengthens the service life of the components.

In yet another embodiment of the present disclosure, spline shafts with different diameters or lengths may be used. They can be longer to accommodate a vehicle with higher ground clearance for better handling in off-road situations. The diameter of the spline shaft can also be modified, but it should still be large enough to allow components (e.g. gears) to interact with one another smoothly.

In yet another embodiment of the present disclosure, the spline shaft may be made of different materials. Although the spline shaft will likely be made of steel, it could be made with different types of steel (e.g. stainless, carbon, or alloy) or even an aluminum alloy. Different materials accommodate local stresses between the slots of the spline shaft.

The spline described above is the key design aspect of achieving the wheel unit's suspension mechanism of the present disclosure. This will be described in further detail in the following sections and in FIG. 11.

Figure 9:
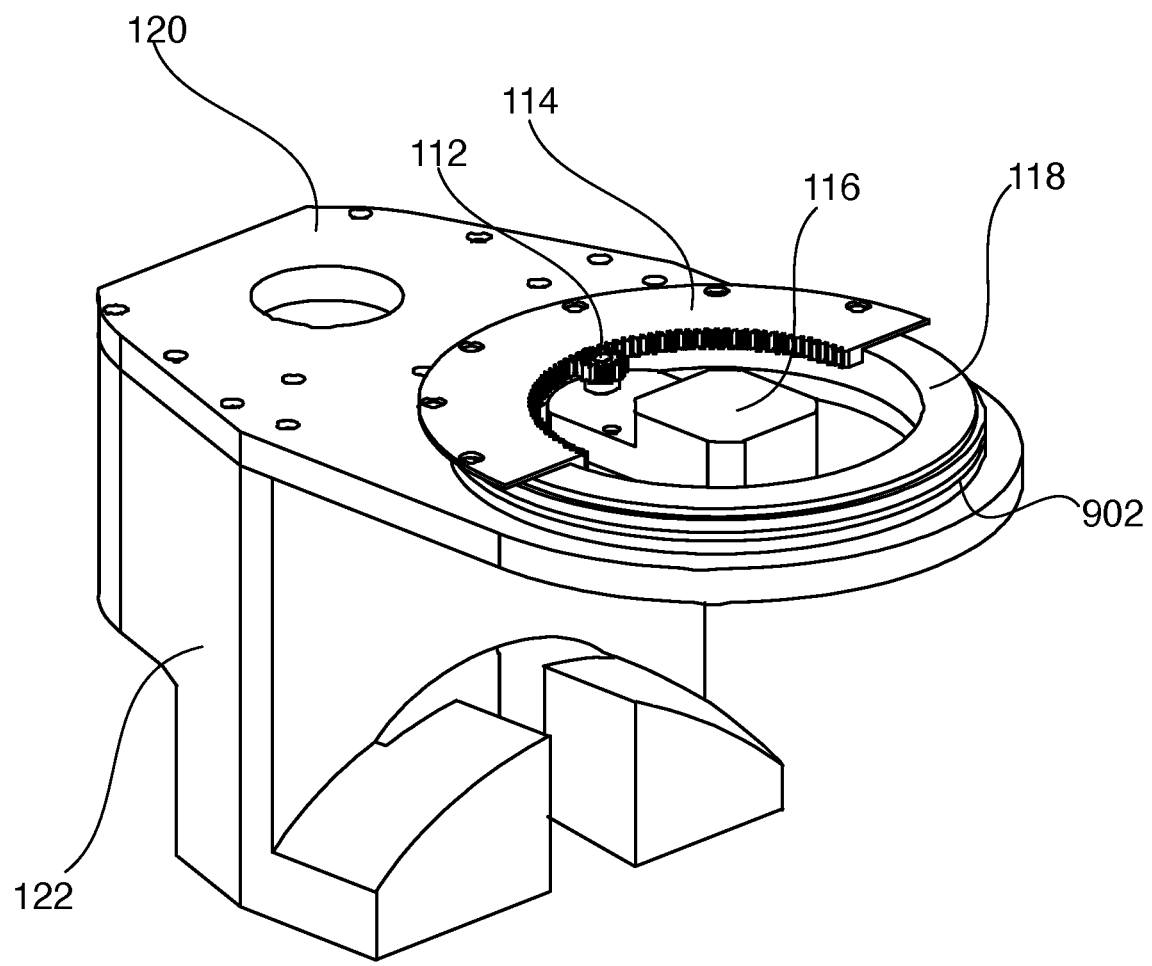
FIG. 9 illustrates a dimetric view of an embodiment of the independent steering system for the front left wheel pertaining to the present disclosure.

FIG. 9 illustrates a dimetric view of an embodiment of the low-profile independent steering system of the wheel unit of the present disclosure. The wheel support frame (104) is supported by the steering hollow shaft (118) via 2 sets of thrust bearings (902). The thrust bearings (902) play a significant role in supporting an axial load. The steering internal gear (114) is fixed and hidden in the steering hollow shaft (118). Meanwhile, the pinion (112) rolls against the teeth of the fixed steering internal gear (114) on top of the wheel support frame (104). The latter component guides the upper and lower swivel arms (120, 122) to move the wheel unit in order to guide the vehicle in the desired direction. The degree that the pinion (112) turns is dependent on the electric power provided by the steering motor (116) in accordance with the driver's command. This motor (116) is presumably connected to the steering wheel via wires, which then receives input from the steering wheel. This setup replaces the steering column and linkages found in traditional steering systems. The motor (116) is geared servo motor with an absolute encoder. All gears are engaged with "0" backlash. The propulsion motor (124), though a separate part, is shown attached to the lower upper and lower swivel arms (120, 122), which moves along the swivel arms as the wheel is being steered.

As noted before, the steering system receives electric power from the main battery of the vehicle. As there is no steering column attached to the individual wheel unit like in a traditional steering system, the wires likely transfer electric power to the steering motor (116). This is also known as steer-by-wire technology. As a result, it saves space in the vehicle interior and reduces the weight of the vehicle. The steering hollow shaft (118) is the key to the compact low-profile design of the present disclosure. The pinion (112), steering internal gear (114), and steering motor (116) are surrounded by the steering hollow shaft (118) and thrust bearings (902). This allows for a reduction in the wheel unit's size.

Figure 10:
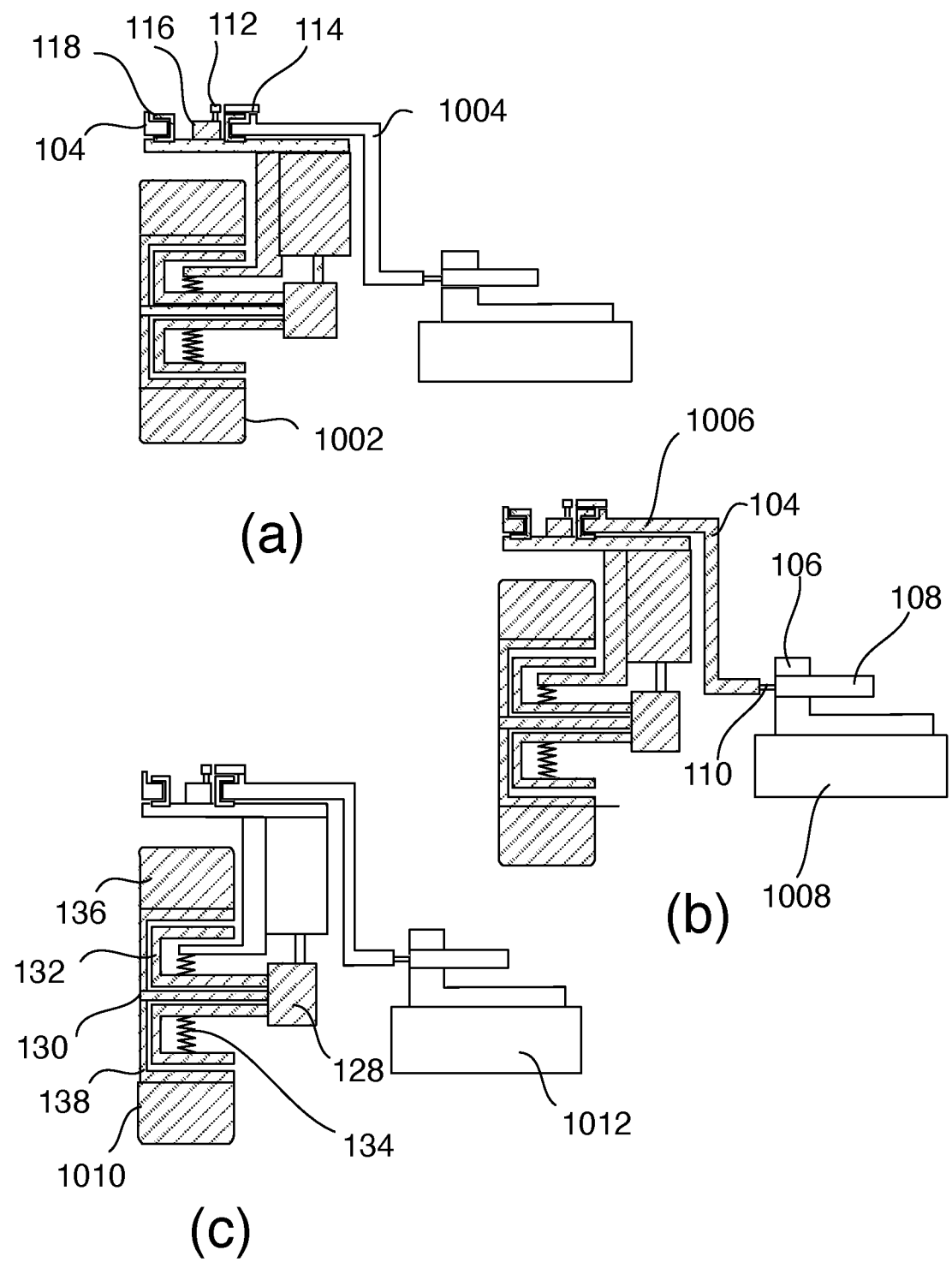
FIG. 10 illustrates a general overview of the independent steering, axle, and sprung versus unsprung mass relationships between different components of a low-unsprung-mass wheel unit for the front left wheel pertaining to the present disclosure.

FIG. 10 illustrates a general overview of the independent steering, axle, and sprung v.s. unsprung mass relationship between different components of a low-unsprung-mass wheel unit for the front left wheel pertaining to the present disclosure.

Sub-figure (a) identifies the relationship between the rotatable portion of the wheel unit (1002) and the non-rotatable portion (1004) as the wheel unit is steered independently. In the rotatable portion, the steering motor (116) drives the pinion (112). The pinion (112) then moves against the teeth of the steering internal gear (114). The steering internal gear (114) is fixed to the steering hollow shaft (118). The steering hollow shaft (118) is attached to the wheel support frame (104) via thrust bearings (902). The steering internal gear (114) and wheel support frame (104) are all parts of the non-rotatable portion (1004). As the wheel unit is turning, the rotatable portion (1002) rotates around the axis of the steering hollow shaft (118) against the non-rotatable portion (1004), as shown in Sub-figure (a). Besides the steering hollow shaft (118), the pinion (112) and the steering motor (116), the other components of the rotatable portion (1002) include the entire propulsion, suspension, and braking system. The non-rotatable portion (1004) consists of the wheel support frame, steering internal gear, entire independent axle, and the vehicle frame.

Sub-figure (b) identifies the relationship between the extendable (1006) and non-extendable (1008) portions of the wheel unit as the wheel axle is adjusted independently. The linear actuator (108), which is powered by the sliding axle motor, pushes the slider hollow rod (110) and wheel support frame (104) along the axle slider base (106). When the wheel support frame (104) is pushed outwards, all the other components in the extendable portion (1006) are pushed out as well. Besides the slider hollow rod (110) and wheel support frame (104), the other components in the extendable portion (1006) include the entire steering, propulsion, braking, and suspension system.

Sub-figure (c) identifies the relationship between the unsprung portion of the wheel unit (1010) and the sprung portion (1012) of the independent suspension system of the present disclosure. The components that make up the unsprung mass (1010) include the gear system (128), propulsion shaft (130), in-rim frame (132), tire (136), and wheel rim (138).

With the combined benefits of the low-unsprung-mass independent steering, propulsion, and braking, a vehicle equipped with all the modularized wheel units of the present disclosure can achieve a novel capability, which is pizza braking. Combined with regenerative braking, the pizza braking feature puts an additional stopping mechanism in case of non-functioning of the regular disc braking system due to any unforeseen causes. It is only possible when independent steering and regenerative braking are all available. A pizza braking is to turn wheels on each axis inward (toe-in) or outward (toe-out).

During pizza braking, the two wheels on each virtual axle steer independently and position themselves in a triangular shape like a slice of pizza. Both inward turn (toe-in) and outward turn (toe-out) are possible technics, and the variety of turning directions and angles are applied according to road conditions. As the triangle is being formed with the front and rear wheels, the independent regenerative braking is applied to help stopping the wheels' rotation. This can be applied to all the wheel axles of the vehicle. The pizza braking function can be extended to parking brake once the parking brake is not functioning or additional braking force is required.

Similarly, the low-profile independent steering mechanism makes parallel driving possible. A parallel driving maneuver refers to a vehicle moving sideways and can be done when all four wheels turn in the same direction; this is referred to as oblique steer mode (a.k.a. crab steer mode). The parallel driving is also useful for parallel parking on the side of the road, switching lanes, etc. Since each wheel can steer itself independently, the four wheels can freely position themselves 90 degrees from the road direction to easily achieve a parallel driving maneuver. In addition, the independent movement of the wheels means that they can all enter oblique steer mode at different angles for precise movement when moving sideways during forward movement (e.g. changing lanes).

A vehicle equipped with this low-unsprung-mass independent steering mechanism can also achieve an in-place rotation. An in-place rotation refers to a vehicle turning around its center point, where the vehicle only carries out the rotation with no linear displacement. In-place rotation is useful for vehicles turning in a limited space such as parking lots, construction sites, etc. Since each wheel can steer independently, four wheels of a standard vehicle can position themselves tangent to a circular trajectory in order to achieve in-place rotation in both the clockwise and counter-clockwise directions.

While the steering motor (116) is the one that commands the pinion (112) to turn based on the driver's input, other factors may play a role in the steering of the wheel unit against the non-rotatable portion (1004). The track width adjustment of the independent axle changes how much the wheel unit should rotate and the steering angle required for the safe operation of the vehicle during a turn. This is seen in transformative turning when the vehicle enters round-steer mode, and the wheels turn at an appropriate angle to make a quicker and sharper turn.

All the independent components of the wheel unit can be applied to offer easy access via the front, rear, and side doors. The exceptional maneuverability, enabled by the 360-degree steering system and the individual application of propulsion torque, allows the vehicle to spin within its own footprint. This helps the vehicle to navigate extremely tight streets and park in tight spaces with curbside precision and at quicker speeds. Once stopped, the vehicle will be able to 'kneel,' which drops the vehicle's entry-point to curb level. This allows for effortless loading of heavy or cumbersome loads, and provides stepless access for passengers with impaired mobility.

Currently, all low-floor vehicles are generally divided into two major types: fully low-floor buses with a low floor throughout the length of the bus (more prevalent in Europe) and low-entry buses with stepless access to only a part of the bus, most commonly between the front door and the middle door (more prevalent in North America). In North America, both types are often called low-floor, as the majority of the vehicles, regardless of type, have a low floor without steps at the doors. The main reason for choosing a low-entry configuration is to allow better placement for the powertrain and other technical equipment in the raised floor section. Also, a low-entry configuration provides a more comfortable ride on rough roads. With the new low-unsprung-mass independent wheel units of the present disclosure, the fully low-floor buses can now be implemented without any difficulty and adverse effects.

Figure 11:
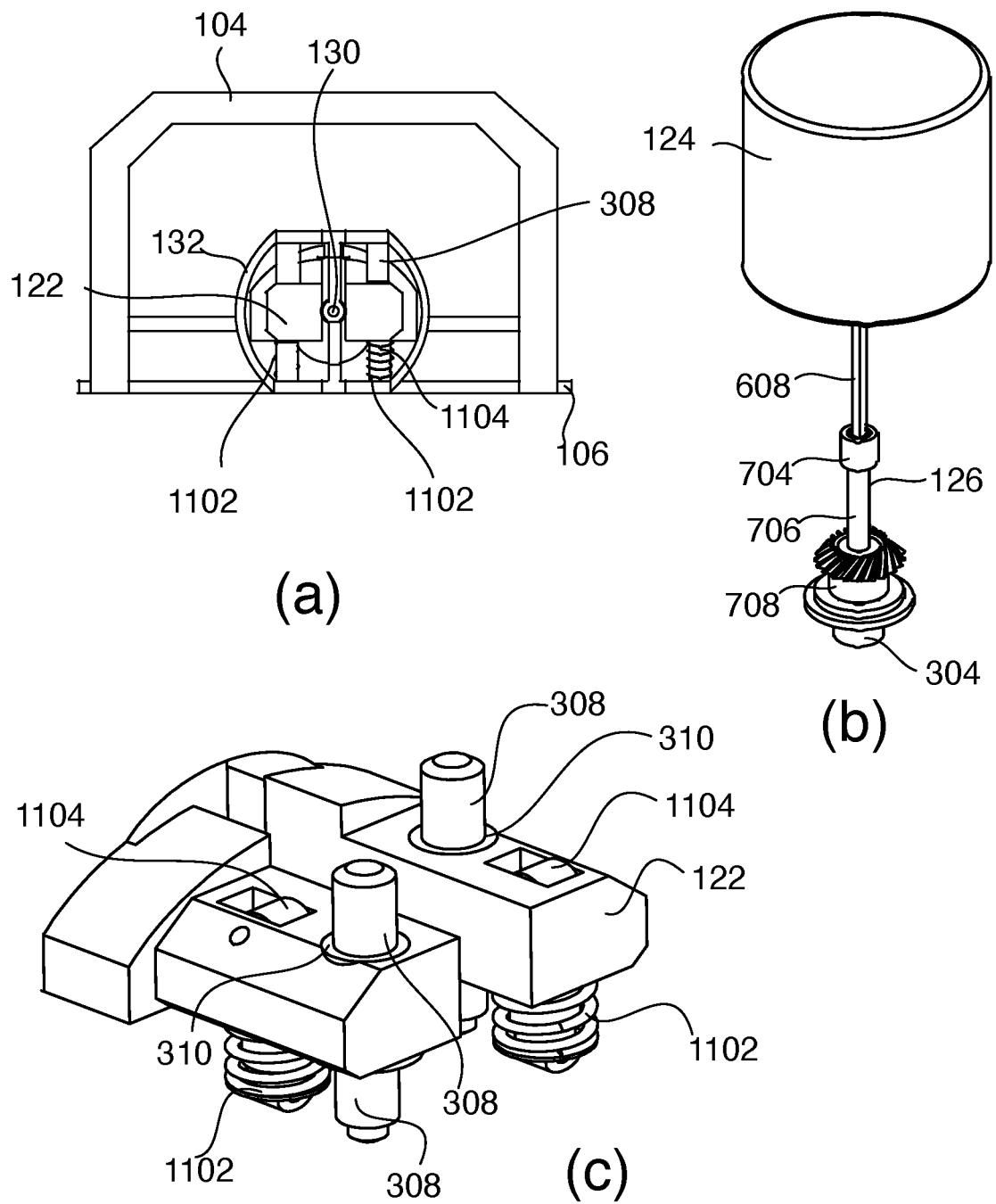
FIG. 11 illustrates a front and two dimetric views of an exemplary embodiment of the special suspension design used for the left front wheel pertaining to the present disclosure.

FIG. 11 illustrates a front and two dimetric views of an exemplary embodiment of the special suspension design used for a left front wheel pertaining to the present disclosure. The suspension is illustrated with the left front wheel in mind. Sub-figure (a) illustrates a front view of the suspension system, which is embedded in the in-rim frames (132) of the wheel unit. As the wheel is attached to the wheel axis (130), the suspension system will be covered by the wheel rim (138).

The dampening mechanism includes two hydraulic cylinders (1104) that act as shock absorbers and liquid springs, which are covered by coil springs (1102). The hydraulic cylinders are connected to the hydraulic dampening and leveling control system which consists of hydraulic pump, accumulator, charging valve, discharging valve, dampening control valve, and tank etc. It also includes suspension shafts (308) and suspension ball bushings (310). These suspension shafts (308) are directly mounted to the in-rim frame (132). The suspension shafts (308) and suspension ball bushings (310) act as vertical linear guides to hold the wheel unit in place and provide support for the vehicle body (102), so the vehicle body is level as the tires bounce. In a sense, the suspension shafts (308) function similarly to linkage arms found in traditional suspension systems. As a result, they bounce simultaneously with the wheel. The suspension ball bushings (310) reduce friction from the movements of the suspension shafts (308). When the wheels bounce on a bumpy road, the suspension bushings (310) slide along the suspension shafts (308).

The suspension system is important for achieving the vehicle tilting during a transformative turn of the present disclosure. As the vehicle starts to perform transformative turning, the hydraulic cylinders (1104) adjust their length depending on the direction of the turn and where the vehicle body tilts. The hydraulic cylinders (1104) of the outer wheels are being charged to increase their length, while the hydraulic cylinders (1104) of the inner wheels are being discharged to decrease their length. This suspension height adjustment ultimately tilts the vehicle body and lowers the center of gravity.

Independent control of the wheel unit may help with some handling problems that may be suspension-related. Once the vehicle is running on a road with a pit. If the pit is too big to avoid by steering. A wheel would be trapped into the pit, then climb up over the edge of the pit, this will cause damage to the suspension, steering system, and the vehicle's structure. By using independent suspension control, the damage will be avoided and passengers will have a comfortable ride. Once a wheel is approaching to the pit, using right front wheel as an example, the suspension dampening valve of this wheel closes, which keeps the hydraulic cylinder at a certain length, at the same time, charge the hydraulic cylinder of the left front wheel, it eventually raises the front side of the vehicle, and makes the right front wheel overhang. After the right front wheel passing over the pit, lower the left front wheel suspension, open the right front wheel dampening valve, then repeat the same process for passing the right rear wheel over the pit. It should be noted that the overhanging wheel does not have propulsion output.

Sub-figure (b) illustrates the spline (126) and propulsion motor (124) with a longer exposed spline shaft (608), located beside the suspension system. All descriptions of the spline and propulsion motor from FIG. 7 can apply here. The spline sleeve (706) rotates with the spline shaft (608) and moves vertically along the spline shaft (608). This spline driving mechanism working together with the suspension system in Sub-figures (a) and (c) is the key to achieve the extremely low-unsprung-mass of the IPASS design of the present disclosure. Only in this way can the propulsion motor (124) be moved to the sprung mass, which greatly reduces the unsprung mass of the wheel unit.

Sub-figure (c) illustrates a dimetric view of the dampening mechanism consisting of the hydraulic cylinders (1104) and springs (1102). The figure also illustrates these cylinders working alongside the suspension shafts (308) with suspension ball bushings (310). The general description of the dampening mechanism in Sub-figure (a) also applies here. In addition to shock absorption, the dampening system also raises or lowers the vehicle's body accordingly while keeping the wheels being contact with the ground surface for traction control.

The cylinders (1104) and springs (1102) are mounted between the bottom of the lower swivel arm (122) and the in-rim frame (132). The two hydraulic cylinders (1104) are placed in traverse directions depending on the corresponding wheel unit. In addition to supporting the weight of the vehicle, they slow down the springing action of the springs (1102) while reducing the magnitude of the vibrations during vehicle movement. In other words, the springs (1102) are kept stiff to ensure that the wheel is firmly placed on the ground during shock absorption. The cylinders (1104) then convert kinetic energy into thermal energy, which is stored inside the cylinder (1104) and then dissipated with hydraulic oil. The energy is first transferred through the spring, which transmits energy via an internal piston. The hydraulic oil in the cylinders (1104) slows down the movement of the internal piston and the spring (1102). The stiffness of the dampening system is controlled by the dampening control valve, opening the dampening control valve will increase the oil flow rate, which makes the suspension softer, closing the dampening control valve will decrease the oil flow rate, which makes the suspension stiffer.

Shock absorbers are velocity-sensitive. As the spline shaft in Sub-figure (b) and the rest of the propulsion system operate at a faster rate, the dampening mechanism via the hydraulic cylinders (1104) provides a greater amount of resistance. This allows for the entire suspension system to adjust to more road conditions and help control unnecessary motions that a moving vehicle may encounter, such as sway, acceleration squat, bound, and brake dive.

The springs (1102) of the suspension can either be coil springs or leaf springs; the type of springs can depend on the position of a particular wheel unit. COIL SPRINGS: These are the more common springs which are often associated with torsion bars of typical vehicles and are generally found at the front of the vehicle. This type of spring compresses and expands to help absorb the wheel's motion. There is little to no internal damping. This type of spring is cheaper and compact, which will likely fit the low-unsprung-mass design of the wheel unit in the present disclosure. LEAF SPRINGS: These are the older type of springs, which are often used at the rear of the vehicle. They have a simpler design and are easier to assemble. This internal friction provides damping. While not as prevalent as coil springs, they are still used in heavy-duty vehicles and trucks.

The hydraulic spring cylinders (1104) are powered by a central hydraulic pump and a control system connected to a liquid storage tank. This mechanism adjusts the pressure and flow to meet the load, road conditions, or passenger/cargo needs of the vehicle. A hydraulic oil tank would fuel the dampers, which can be pressurized with a few controls. A hydraulic suspension system is customizable and generally provides a firmer ride. However, hydraulic systems have a bumpier ride, are costlier to manufacture, and are more susceptible to fluid leaks or vehicle damage.

In an alternative embodiment of the present disclosure, the hydraulic spring cylinders are replaced with air bellows or cylinders powered by compressed gas. By using an air compressor, the air bellows or cylinders help to provide a smoother ride and better handling. Furthermore, they are more affordable and, in the case of trucks, improve towing and hauling performance by increasing load capacity. However, regardless of the power source, the pneumatic system needs more space than a hydraulic system due to lower pressure. To fit an air suspension within the in-rim frame is a challenge.

Traditional independent suspension systems (i.e. MacPherson strut, double wishbone or multi-link suspension) use a strut assembly, which consists of a single shock absorber with a coil spring and is located beside or above the wheel. This takes up more space in the vehicle, as a consequence, the independent axle adjustment function may be affected by the traditional suspension dampening mechanism. The length of the axle may be limited due to the suspension arms that link the wheel unit to the vehicle frame.

As the vehicle is braking, the suspension system keeps the vehicle stable and prevents it from nosediving. The front wheel hydraulic cylinders (1104) slightly increase the length, it causes the front side of the vehicle to rise meanwhile, closing the dampening control valve of every hydraulic cylinder, it makes the damper stiffer. The combination of head-up posture and stiffer dampening significantly increase vehicle handling during braking.

From the information noted above, a unique independent suspension mechanism is achieved.

In contrast to a beam axle or de Dion axle systems in which the wheels are linked, movement on one side does not affect the wheel on the other side. An independent suspension is any automobile suspension system that allows each wheel on the same axle to move vertically (i.e. reacting to a bump on the road) 1145 independently of the others. In a preferred embodiment of the present disclosure, the in-rim embedded dampening mechanism must work together with the spline design (126) to provide the specialized, customized, and powerful independent suspension mechanism of the present disclosure.

It should be obvious to those ordinarily skilled in the art that all the previous discussions also 1150 apply to the vehicles with more than four wheels. In addition to typical passenger vehicles and trucks, the new mechanism, features, and machine of the present disclosure can be implemented on various other types of vehicles, including but not limited to: van or lorries with multiple wheels, buses, motor coaches, trolleys, trains, etc.

The invention claimed is:

1. An electric wheel module, comprising:
a wheel;
a swivel arm;
a support frame;
a propulsion sub-system for the wheel;
wherein the propulsion is provided by a first electric motor that is fixed to the swivel arm;
wherein the axis of the first electric motor is perpendicular to the axis of the wheel;
wherein the first electric motor drives the wheel rotation using a spline shafting mechanism and gear system;
a steering sub-system for the wheel;
wherein the steering is provided by a second electric motor that is fixed to the swivel arm;
wherein the second electric motor drives a pinion;
wherein both the pinion and second electric motor are inside a hollow shaft that is fixed to swivel arm.

2. The module of claim 1, further comprising an axle adjustment sub-system for the wheel; wherein the adjustment is provided by a third electric motor; wherein the axle length is adjusted between the third electric motor and support frame.

3. The module of claim 1, further comprising a suspension sub-system for the wheel; wherein the suspension is provided between the wheel and swivel arm; wherein the suspension uses linear guides that are parallel to both the first electric motor and spline shaft.

4. The module of claim 1, wherein the gear system includes at least a bevel and planetary gear reducer; wherein the planetary gear reducer may comprise a sun gear, internal gear, and number of planetary gears.

5. The module of claim 3, wherein an unsprung mass includes an in-rim frame, the gear system, axis, and wheel.

6. The module of claim 1, wherein the spline shafting mechanism involves a ball spline shaft that relays rotation around the shaft and allows linear sliding along the same; wherein the linear sliding is realized by revolving an array of balls, housed by a nut, along a groove of the spline shaft to allow for nearly frictionless movement during propulsion.

7. The module of claim 1, wherein the pinion rotates against an internal gear that is also fixed to the support frame and the hollow shaft may rotate around the support frame through two sets of thrust bearings.

8. A vehicle built with a plurality of the wheel modules of claim 1, wherein each module is controlled by a common central controller but functions independently from all other modules.

9. The vehicle of claim 8, wherein the plurality is four or more.

10. The vehicle of claim 9, wherein two of the wheel modules form a front virtual axle with a front track; two of the wheel modules form a rear virtual axle with a rear track.

11. A method of electrically controlling the vehicle of the claim 10, comprising:
controlling the first wheel of the front virtual axle independently from all other wheels;
controlling the second wheel of the front virtual axle independently from all other wheels;
controlling the first wheel of the rear virtual axle independently from all other wheels;
controlling the second wheel of the rear virtual axle independently from all other wheels;
wherein the independent control includes propelling, braking, steering, axle length and suspension height adjusting.

12. The method of claim 11, wherein the independent control further includes driving torque and/or braking torque vectoring.

13. The method of claim 11, wherein the front track is extended by out-toeing during vehicle movement and the rear virtual axle follows suit afterwards; wherein the front track is retracted by in-toeing during vehicle movement and the rear virtual axle follows suit afterwards.

14. The method of claim 11, wherein a traction-adapted turn is made by optimally controlling all four wheels' actions according to the vehicle traction need; wherein the wheels on the side close to the turning center are inner wheels and those on the other side are outer wheels.

15. The method of claim 14, wherein the following steps are further comprised in the order:
   starting to make the turn;
   out-toeing the inner wheel of the front virtual axle;
   extending and toeing the outer wheel of the front virtual axle to increase the front rack width;
   in-toeing the inner wheel of the rear virtual axles;
   extending and out-toeing the outer wheel of the rear virtual axle to increase the rear track width;
   reaching the maximum front and rear track width during the turn;
   retracting and recovering the toeing of the outer wheel of the front virtual axle to decrease the front track width;
   recovering the toeing of the inner wheel of the front virtual axle;
   retracting and recovering the toeing of the outer wheel of the rear virtual axle to decrease the rear track width;
   recovering the toeing of the inner wheel of the rear virtual axle;
   wherein the front and rear track widths are recovered when the turn is finished;
   wherein the following simultaneous steps are further comprised:
   decreasing the height of the suspension of the wheel on the side close to the turning center;
   increasing the height of the suspension of the wheel on the other side away from the turning center;
      wherein the vehicle body is tilted towards to the side close to the turning center;
      wherein the tilting reaches its maximum during the turn;
      wherein the tilting is zero when the turn is finished;
   wherein each step is optimally adaptive to the traction between the wheel and ground at the moment.

16. The method of claim 11, wherein the following steps are further comprised in the order:
   steering each wheel to a direction tangent to a circular trajectory;
   driving the wheels to turn along the trajectory;
   steering each wheel back to its original direction.

17. The method of claim 11, wherein the following steps are further comprised in the order:
   steering each wheel in a direction towards a vehicle side;
   driving the wheels to move the vehicle sideways;
   steering each wheel back to its original direction.

18. The method of claim 11, wherein the following steps are further comprised in the order:
   steering the first and second wheel of the front and/or rear virtual axle to form a toe-in or toe-out formation;
   braking all the wheels to stop the vehicle;
      wherein the braking is regenerative braking.

19. The method of claim 11, wherein the following steps are further comprised in the order when a wheel is about to reach an obstacle or region on the ground:
   extending and out-toeing the wheel's virtual axle to increase the track width until the obstacle/region is not in the wheel's path;
   driving the vehicle past the obstacle/region;
   retracting and in-toeing the wheel's virtual axle to recover the track width.

20. The method of claim 11, wherein the following steps are further comprised in the order when a wheel of a virtual axle is about to reach a pit or region on the ground:
   stiffening the wheel's suspension by closing its dampening valve;
   lifting the other wheel of the virtual axle by charging its hydraulic cylinder in suspension;
   driving the vehicle past the obstacle/region with the wheel overhanging;
   unstiffening the wheel's suspension by opening its dampening valve;
   lowering the other wheel of the virtual axle by discharging its hydraulic cylinder in suspension.

* * * * *